United States Patent [19]
Tanaka

[11] Patent Number: 6,118,945
[45] Date of Patent: *Sep. 12, 2000

[54] LENS CONTROL APPARATUS

[75] Inventor: Taeko Tanaka, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/268,107

[22] Filed: Mar. 15, 1999

[30] Foreign Application Priority Data

Mar. 20, 1998 [JP] Japan .................................. 10-071544

[51] Int. Cl.[7] .......................... G03B 13/36; G03B 17/00; H02P 8/26
[52] U.S. Cl. .............................. 396/79; 396/90; 396/136; 348/345; 348/358; 318/696
[58] Field of Search ........................... 396/79–83, 85–87, 396/72, 133, 135, 136, 90, 129; 348/358, 347, 345; 318/696

[56] References Cited

U.S. PATENT DOCUMENTS

| 4,743,931 | 5/1988 | Matsuzaki et al. | 396/133 |
| 5,424,776 | 6/1995 | Hirasawa | 348/345 |
| 5,446,358 | 8/1995 | Nakata | 318/696 |
| 5,448,295 | 9/1995 | Hirota | 348/345 |
| 5,594,311 | 1/1997 | Yasuda et al. | 318/696 X |
| 5,982,134 | 11/1999 | Tanaka | 318/696 |

Primary Examiner—W. B. Perkey
Attorney, Agent, or Firm—Robin, Blecker & Daley

[57] ABSTRACT

A lens control apparatus drives a lens with a sine wave by means of a pulse motor and detects the position of the lens by counting the number of pulses during the driving of the pulse motor, and stores a stop phase which is reached by a rotor when the pulse motor is brought to a driving-stopped state. When the lens control apparatus is to move the lens to an initial position and initialize a counter for detecting the position of the lens, the lens control apparatus corrects the count value of the counter by using information indicative of the stored stop phase of the rotor.

20 Claims, 17 Drawing Sheets

FIG. 16
| EN1 | IN1 | Tr8 | Tr9 | Tr10 | Tr11 |
|------|------|------|------|------|------|
| HIGH | HIGH | ON | OFF | OFF | ON |
| HIGH | LOW | OFF | ON | ON | OFF |
| LOW | HIGH | OFF | OFF | OFF | OFF |
| LOW | HIGH | OFF | OFF | OFF | OFF |
FIG.17(a)
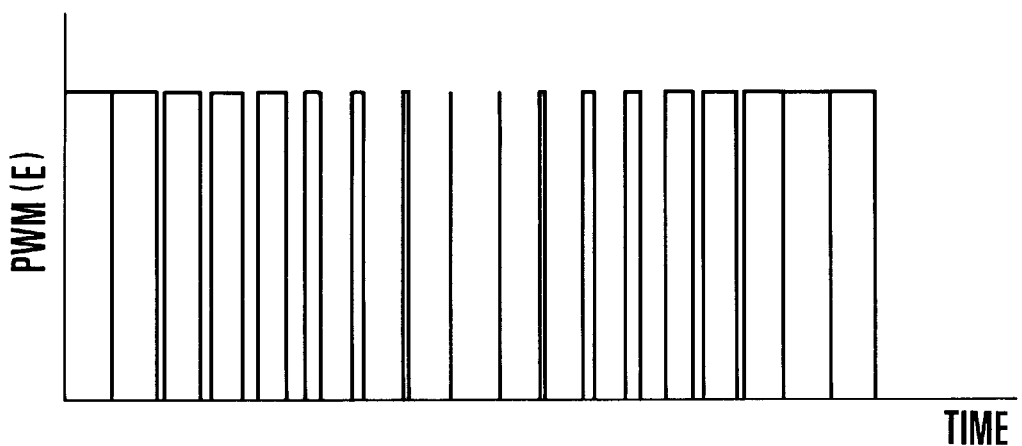
FIG.17(b)
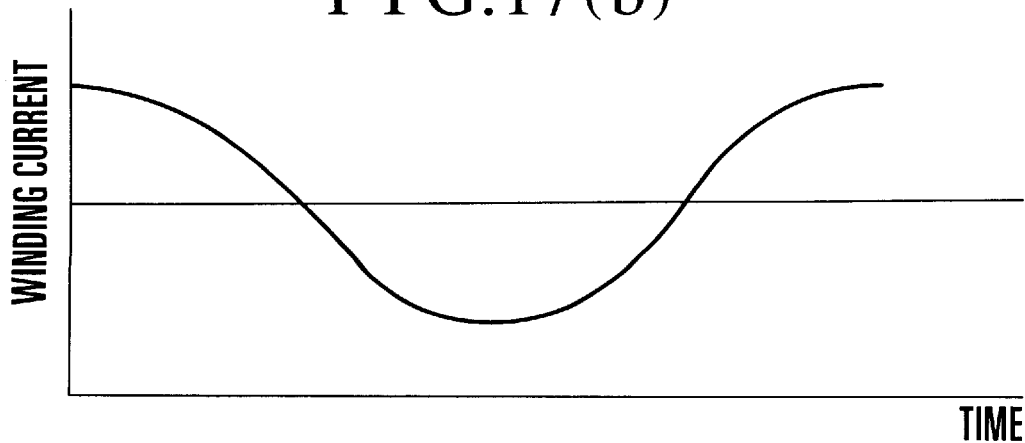

FIG. 18

| ROM ADDRESS | 0 | 1 | 2 | 3 | 4 | 5 | 6 | 7 |
|---|---|---|---|---|---|---|---|---|
| Dn | 01 | 01 | 03 | 06 | 0A | 0F | 16 | 1D |
| ROM ADDRESS | 8 | 9 | 10 | 11 | 12 | 13 | 14 | 15 |
| Dn | 26 | 2F | 39 | 44 | 4F | 5B | 67 | 73 |
| ROM ADDRESS | 16 | 17 | 18 | 19 | 20 | 21 | 22 | 23 |
| Dn | 80 | 8C | 98 | A4 | B0 | BB | C6 | D0 |
| ROM ADDRESS | 24 | 25 | 26 | 27 | 28 | 29 | 30 | 31 |
| Dn | D9 | E2 | E9 | F0 | F5 | F9 | FC | FE |
| ROM ADDRESS | 32 | 33 | 34 | 35 | 36 | 37 | 38 | 39 |
| Dn | FF | FE | FC | F9 | F5 | F0 | E9 | E2 |
| ROM ADDRESS | 40 | 41 | 42 | 43 | 44 | 45 | 46 | 47 |
| Dn | D9 | D0 | C6 | BB | B0 | A4 | 98 | 8C |
| ROM ADDRESS | 48 | 49 | 50 | 51 | 52 | 53 | 54 | 55 |
| Dn | 80 | 73 | 67 | 5B | 4F | 44 | 39 | 2F |
| ROM ADDRESS | 56 | 57 | 58 | 59 | 60 | 61 | 62 | 63 |
| Dn | 26 | 1D | 16 | 0F | 0A | 06 | 03 | 01 |

LENS CONTROL APPARATUS

BACKGROUND OF THE INVENTION

1. Field of the Invention

The present invention relates to an apparatus for and a method of controlling a pulse motor as well as an image pickup system using such apparatus or method, and, more particularly, to driving control for driving the pulse motor.

2. Description of Related Art

In general, stepping motors are widely used as drive sources for office automation equipment or the like because their rotational angles and speeds can be accurately controlled by open control.

Such a stepping motor has a constant rotational angle per step pulse and can realize position detection merely by incrementing the number of step pulses. Since the stepping motor does not need a special encoder for position detection, the stepping motor has also recently been used as a lens control source for an image pickup system such as a video camera.

One example of a method of driving a pulse motor will be described below.

FIG. 14 is a view showing one example of the arrangement of a pulse motor and a pulse motor control apparatus.

The arrangement shown in FIG. 14 includes driver circuits 1 and 2, motor windings 3 and 4 of a two-phase pulse motor 5, and a magnet 6 of a two-phase pulse motor 5. A microcomputer 7 for performing motor control includes a PWM (pulse width modulation) unit 7a which outputs pulse signals (E and F) each having a settable frequency and duty ratio, a programmable timer unit 7b, ports "a" and "b" through each of which the microcomputer 7 can output a high-level signal and a low-level signal, and a ROM 7c which stores data such as driving speeds for the pulse motor 5 and PWM duty ratios.

FIG. 15 is a view showing the internal construction of each of the driver circuits 1 and 2. The construction shown in FIG. 15 includes PNP transistors 8 and 9, NPN transistors 10 and 11, diodes 12, 13, 14 and 15, resistors 16, 17, 18 and 20, AND gates 20 and 21, and a NOT gate 22.

Referring to FIG. 15, if an input terminal EN1 is at a high level and an input terminal IN1 is also at a high level, transistors 8 and 11 (Tr8 and Tr11) are on and transistors 9 and 10 (Tr9 and Tr10) are off, so that current flows through the motor winding 3 from an output terminal OUT1 to an output terminal OUT2. If the input terminal EN1 is at the high level and the input terminal IN1 is also at a low level, the transistors 9 and 10 are on and the transistors 8 and 11 are off, so that current flows through the motor winding 3 from the output terminal OUT2 to the output terminal OUT1. If the input terminal EN1 is at a low level, all the transistors 8, 9, 10 and 11 are off irrespective of the input level at the input terminal IN1, so that the motor winding 3 from the output terminal OUT1 to the output terminal OUT2 is placed in a high impedance state.

FIG. 16 is a table showing the relation between the input levels at the input terminals EN1 and IN1 and the states of the transistors 8 to 11 (Tr8 to Tr11). Although FIG. 16 shows such relation for only the driver circuit 1, a relation for the driver circuit 2, i.e., the relation between input terminals IN2 and EN2 and the states of the transistors 8 to 11 (Tr8 to Tr11), is also similar to that shown in FIG. 16.

Referring back to FIG. 14, a pulse signal E outputted from the PWM unit 7a of the microcomputer 7 is supplied to the input terminal IN1 of the driver circuit 1, while a pulse signal F outputted from the PWM unit 7a of the microcomputer 7 is supplied to the input terminal IN2 of the driver circuit 2. The input terminals EN1 and EN2 are connected to the output ports "a" and "b" of the microcomputer 7, as shown in FIG. 14, so that the input levels at the input terminals EN1 and EN2 are controlled by the microcomputer 7. However, these input terminals EN1 and EN2 may be fixed to the high levels without being connected to the microcomputer 7.

A method of controlling currents in the motor windings 3 and 4 by PWM (the pulses E and F) will be described below. The microcomputer 7 supplies a PWM output to each of the driver circuits 1 and 2 at a predetermined frequency fp. The motor windings 3 and 4 are driven with the above-described logic according to whether the output level of the PWM unit 7a is high or low, but the frequency fp is high and current according to the duty ratio shown in FIGS. 17(a) and 17(b) flows through each of the motor windings 3 and 4 by the action of the inductance of the motor windings 3 and 4.

Accordingly, to implement sine-wave driving which does not cause large vibration nor large noise, the form of variation in the PWM duty ratio needs only to be made approximately sinusoidal. To realize far more efficient motor driving, the variation in the PWM duty ratio needs only to be adjusted so that the amplitude of a sine wave for the sine-wave driving varies according to the rotational speed of the motor. A method of manipulating such duty ratio will be described below.

Specifically, as shown in FIG. 18, basic duty ratio data Dn having a maximum value FFh and a minimum value 00h is stored in the ROM 7c. The duty ratio data Dn is obtained by dividing, for example, one cycle of a sine-wave signal into sixty-four points. The numerical values "0" to "63" which are arranged in the upper row of the table of FIG. 18 represent addresses assigned to the ROM 7c for convenience's sake, and correspond to the values arranged in Part A of FIG. 19. These addresses are used to determine which phase position of a sinusoidal waveform of driving current for driving the pulse motor corresponds to a position where a rotor of the pulse motor is currently located. Accordingly, the microcomputer 7 can effect position detection without the use of an encoder by counting a pulse phase position corresponding to Part D of FIG. 19, i.e., the number of pulses. FIG. 19 shows the state in which the pulse motor is driven by eight pulses in one cycle of the sine-wave driving current.

The numerical values arranged in the lower row of the table of FIG. 18 represent the duty ratio data Dn which are stored in the respective addresses. These duty ratio data Dn are sequentially read by means of a timer interrupt of the microcomputer 7, and are used as a duty ratio for PWM. The rotational speed of the pulse motor can be controlled by controlling a timer interrupt time (Tt). The PWM signals E and F are shifted from each other by a phase angle of 90 degrees by shifting readout ROM addresses by sixteen addresses.

If the driving of the above-described pulse motor needs to be started with the rotor being stopped, a torque larger than a rotor holding torque needs to be applied to the pulse motor. Accordingly, if the pulse motor is to be driven with sine-wave current, driving current equivalent to the required rotor holding torque is needed, and the driving of the pulse motor is not started until the phase of the driving current reaches the equivalent driving phase. For example, if the driving of the pulse motor is to be stopped with the rotor being stopped in the phase state indicated by a point B in FIG. 19, driving current whose phase state is at least equivalent to the phase position D=5 must be applied to the pulse motor.

However, when position detection is to be performed by incrementing the value of a step pulse to be applied to the pulse motor, if the driving of the pulse motor is started at the ROM address A=0 as shown in FIG. 19, the driving of the pulse motor is not started up to the address A=40, but the step pulse will advance by five pulses (the phase position D=5) and the position detection will advance by five pulses after the driving is started. This leads to the problem that a deviation occurs when position detection is performed by counting the number of pulses.

BRIEF SUMMARY OF THE INVENTION

The present invention has been made to solve the above-described problems, and a first object of the present invention is to improve position accuracy in pulse motor driving using an approximately sinusoidal driving current.

A second object of the present invention is to make it possible to effect accurate phase position detection without using a special position detecting device in a pulse motor using an approximately sinusoidal driving current.

A third object of the present invention is to provide a video camera using the aforesaid pulse motor driving.

To achieve the above-described objects, according to one aspect of the present invention, there is provided a pulse motor control apparatus which comprises driving means for driving a pulse motor with an approximate sine wave, counting means for counting the number of pulses during driving of the pulse motor, and storage means for storing a stop phase position which is reached by a rotor when the pulse motor is brought to a driving-stopped state.

The above and other objects, features and advantages of the present invention will become apparent from the following detailed description of preferred embodiments of the present invention, taken in conjunction with the accompanying drawings.

BRIEF DESCRIPTION OF THE SEVERAL VIEWS OF THE DRAWING

FIG. 16 is a table showing the relation between input terminals EN1 and IN1 and the states of transistors 8 to 11 (Tr8 to Tr11), all of which are shown in FIG. 15;

FIGS. 17(a) and 17(b) are views showing current which flows through each motor winding shown in FIG. 14 and the duty ratio of the current;

FIG. 18 is a view showing an example of duty ratio data stored in the ROM shown in FIG. 14.

DETAILED DESCRIPTION OF THE INVENTION

Preferred embodiments of the present invention will be described below in detail with reference to the accompanying drawings.

(First Embodiment)

Figure 1:
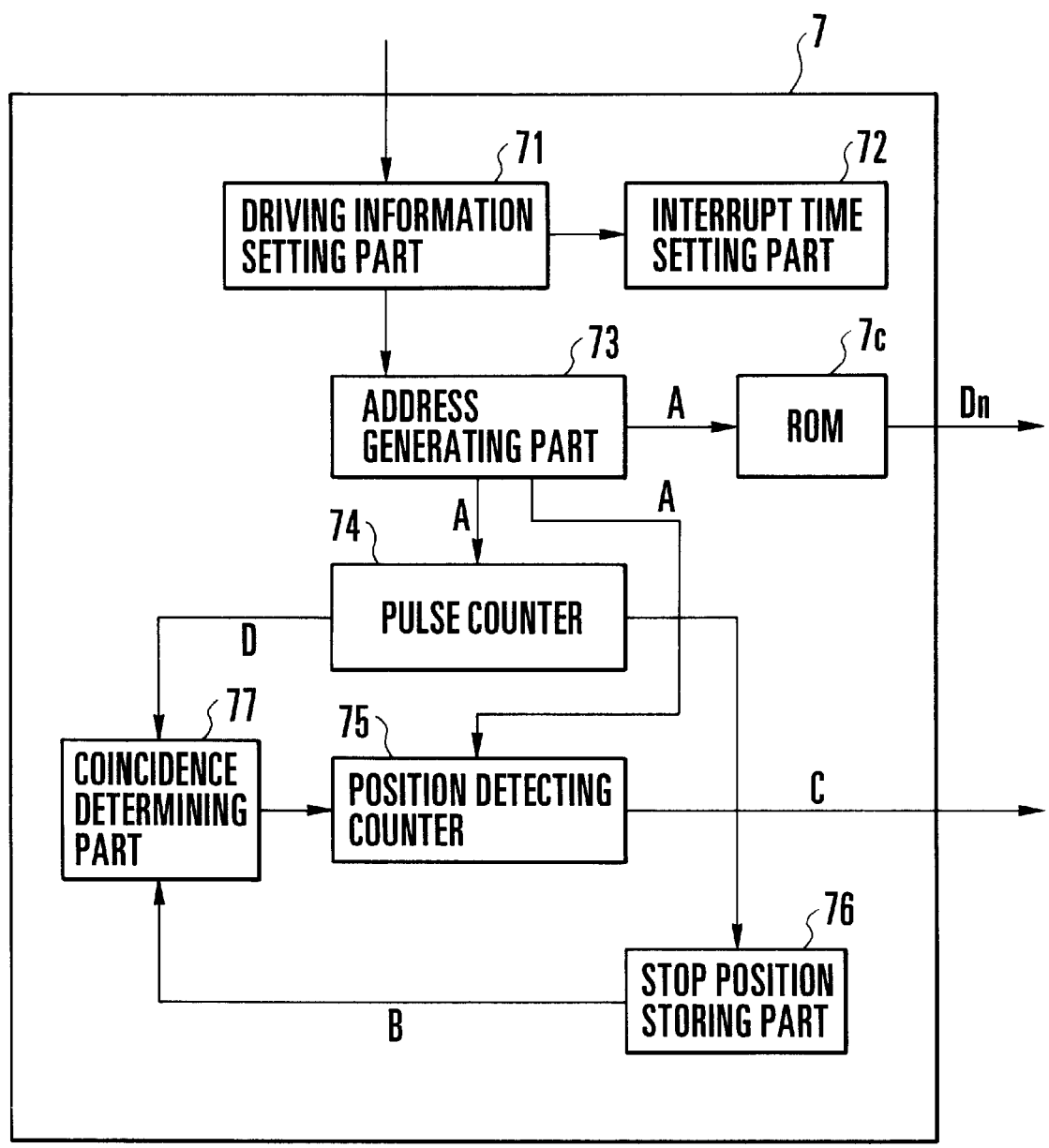
FIG. 1 is a block diagram showing element features of the present invention and showing the functional construction of a microcomputer provided in a pulse motor control apparatus.
Figure 2:
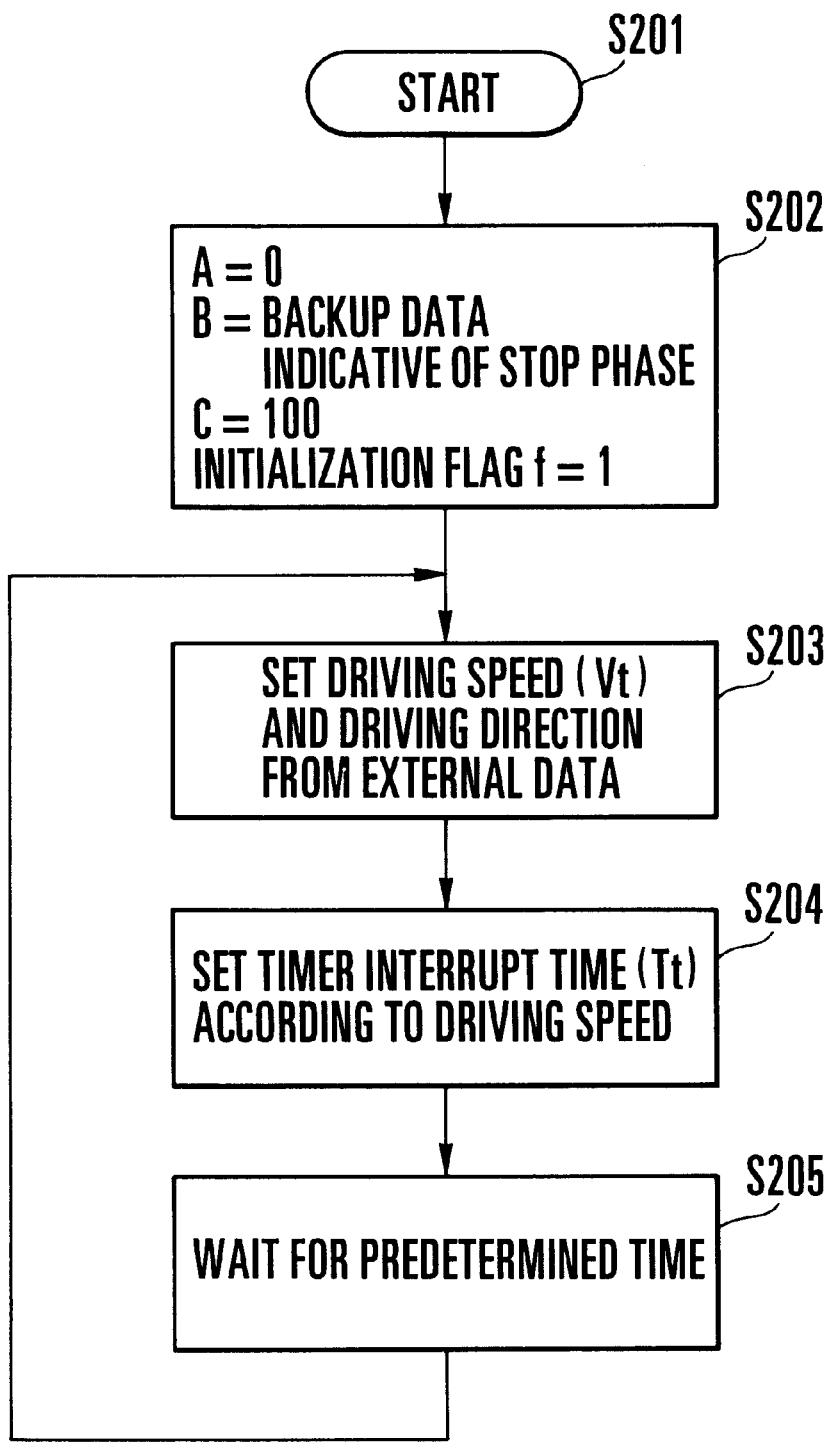
FIG. 2 is a flowchart showing operations to be executed by the microcomputer at the time of a start of driving of a pulse motor and during the driving thereof in a first embodiment of the present invention.
Figure 14:
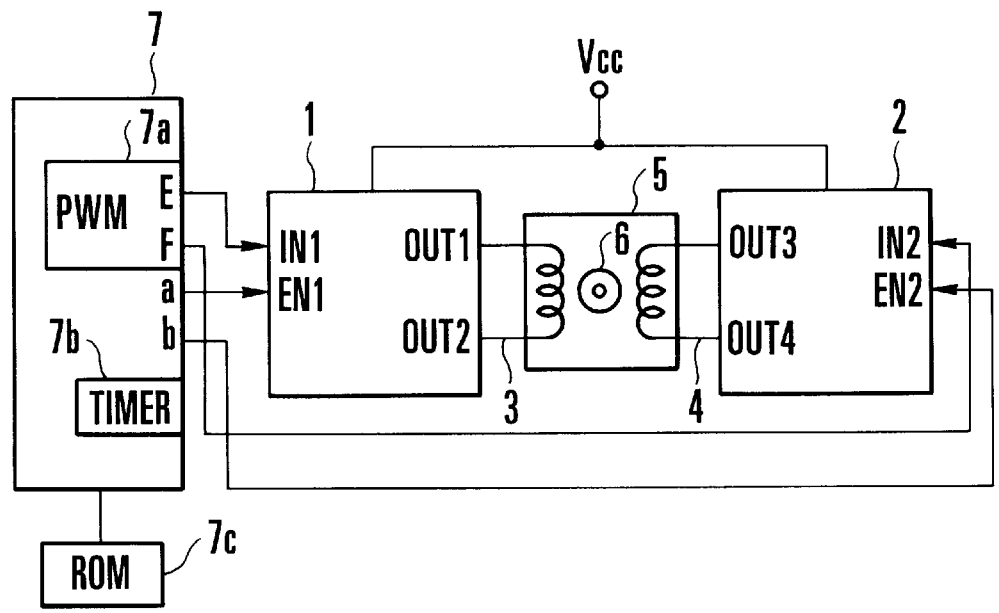
FIG. 14 is a view showing one example of the arrangement of a pulse motor and a pulse motor control apparatus in each of the present embodiments.
Figure 15:
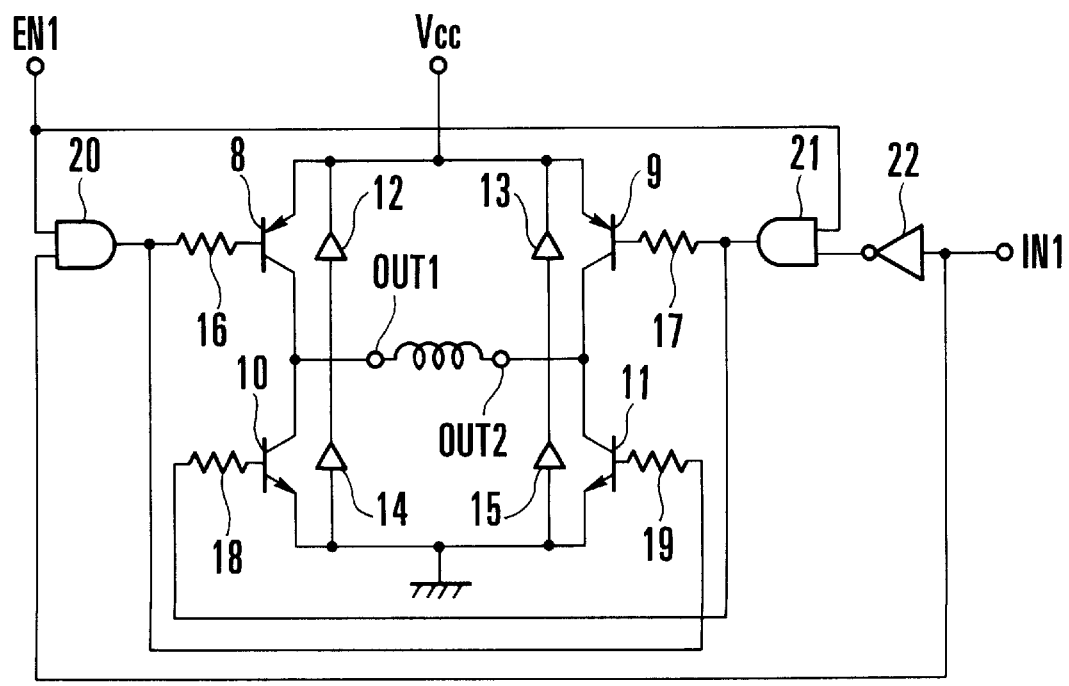
FIG. 15 is a view showing the internal construction of each of the driver circuits shown in FIG. 14.

A pulse motor control apparatus according to a first embodiment of the present invention is realized by altering the process of a microcomputer 7 shown in FIG. 14. FIG. 1 is a block diagram showing the essential functional construction of the microcomputer 7 according to the first embodiment of the present invention. FIG. 2 is a flowchart showing operations to be executed by the microcomputer 7 at the time of a start of driving of a pulse motor and during the driving thereof in the first embodiment of the present invention.

In the microcomputer 7 shown in FIG. 1, a driving information setting part 71 is arranged to set both a driving speed Vt at which to drive the pulse motor and a driving direction in which to drive the pulse motor, in accordance with information supplied to the microcomputer 7 from the outside. An interrupt time setting part 72 is arranged to set a timer interrupt time Tt according to the driving speed Vt which is set by the driving information setting part 71. At each timer interrupt time Tt which is set by the interrupt time setting part 72, duty ratio data Dn is read and outputted from a ROM 7c in the form of a driving current which realizes the duty ratio of a PWM unit.

An address generating part 73 is arranged to count up or down each time a timer interrupt process occurs, thereby incrementing or decrementing the value of an address A according to the driving direction in which to drive the pulse motor, which direction is set by the driving information setting part 71. The duty ratio data Dn is read from the ROM 7c in accordance with the address A.

Figure 19:
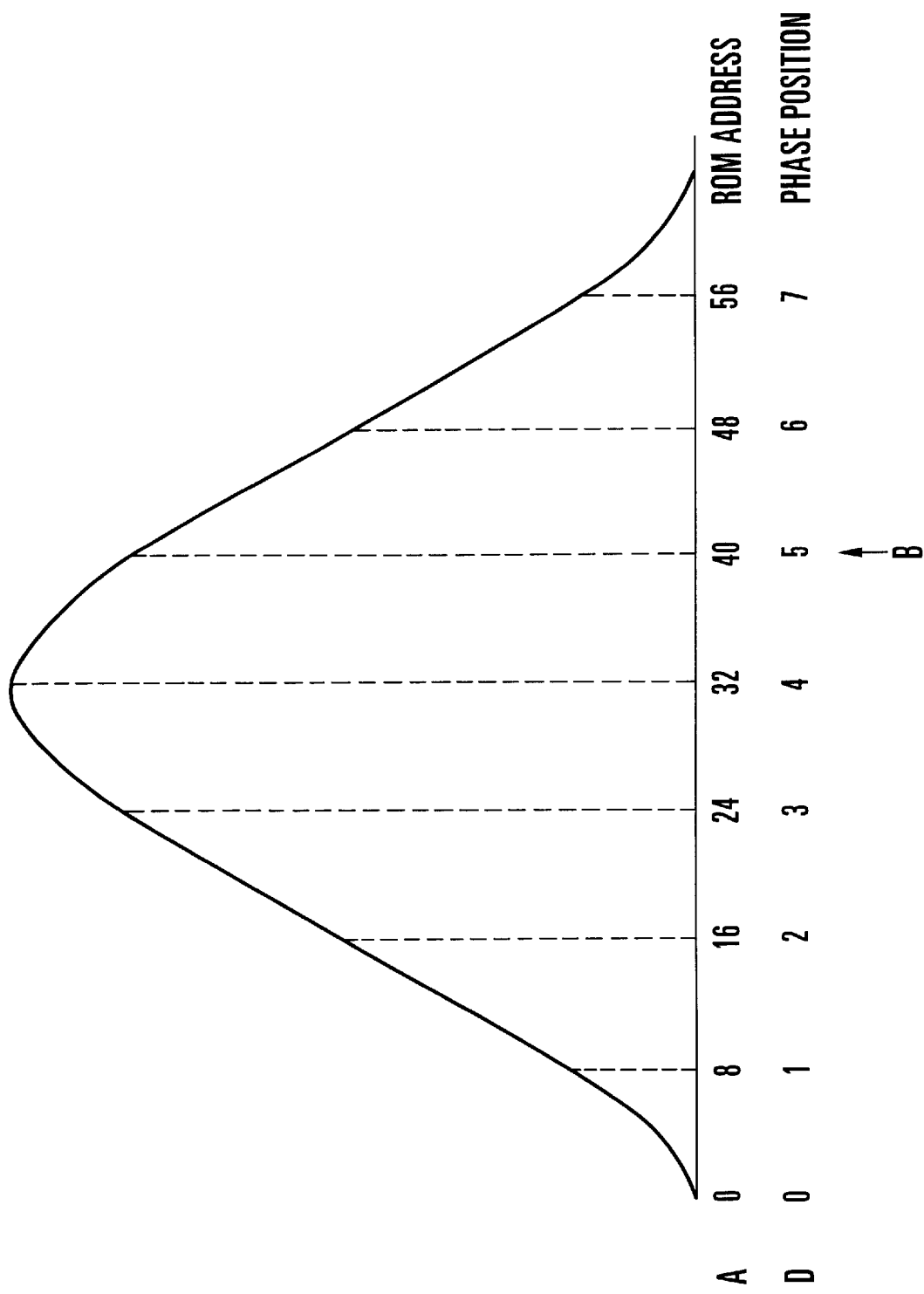
FIG. 19 is a view showing an example of approximate sine-wave driving current.

A pulse counter 74 is arranged to output a count value D for each pulse width with which to drive the pulse motor. Assuming that, as shown in FIG. 19, one cycle of sine-wave driving current indicated by the duty ratio data Dn is represented by sixty-four addresses and eight pulse periods constitute one cycle, one pulse is produced at a time at intervals of a multiple of 8 in one cycle which is divided into sixty-four points, and each time the value of the address A outputted from the address generating part 73 is varied by eight, the pulse counter 74 counts up or down to increment or decrement the count value C by one.

A position detecting counter 75 is arranged to detect a phase position C at which the pulse motor which is in its driven state is currently placed, and output the detected phase position C as a step pulse. Similarly to the pulse counter 74, each time the value of the address A is varied by eight, the position detecting counter 75 counts up or down to increment or decrement the count value C by one. A stop position storing part 76 is arranged to store a phase position which is reached by a rotor (not shown) of the pulse motor at the time of stoppage of the driving of the pulse motor in the previous driving operation (i.e., a count value which is stored in the pulse counter 74 when the driving of the pulse motor is stopped). The stop position storing part 76 is composed of a nonvolatile memory medium which holds its stored contents even after a power source (not shown) is turned off.

A coincidence determining part 77 is arranged to determine whether the count value D counted by the pulse counter 74 coincides with a count value B representative of the phase position of the step pulse, which phase position is previously stored (backed up) in the stop position storing part 76 at the time of stoppage of the driving motor in the previous driving operation. If the coincidence determining part 77 determines that the count value D coincides with the count value B, the coincidence determining part 77 controls the position detecting counter 75 so that the position detecting counter 75 starts its counting operation.

Referring to FIG. 2, in Step S201, if the power source is turned on, the microcomputer 7 starts driving the pulse motor. In Step S202, the microcomputer 7 initializes the counters and the like incorporated in the microcomputer 7. Specifically, the address generating part 73 initializes the address A to be used for sequentially reading the duty ratio data Dn stored in the ROM 7c, such as that shown in FIG. 18, and the coincidence determining part 77 reads the phase state of a stop position of the rotor of the motor, which was stored (backed up) in the stop position storing part 76 when the power source was turned off in the previous driving operation, for example, the count value B indicative of the phase position shown in FIG. 19. Then, the microcomputer 7 initializes the count value C of the position detecting counter 75 (in this example, initial data is "100"), and sets an initialization flag f indicative of a power-on state to a "1" (high) state.

Then, in Step S203, the driving speed Vt at which to drive the pulse motor and a driving direction in which to drive the pulse motor are set in accordance with information supplied from the outside. The driving speed Vt and the driving direction may be inputted into the microcomputer 7 through an arrangement which uses communication, an external switch of the microcomputer 7 or the like. In Step S204, the interrupt time setting part 72 sets the timer interrupt time Tt according to the driving speed Vt which has been set in Step S203. The faster the driving speed Vt, the shorter the timer interrupt time Tt, whereas the slower the driving speed Vt, the longer the timer interrupt time Tt. Then, in Step S205, the process waits until the next driving information is received from the outside, and if the next driving information is received, the process returns to Step S203.

The microcomputer 7 drives the pulse motor by repeating the above-described operation shown in FIG. 2.

Figure 3:
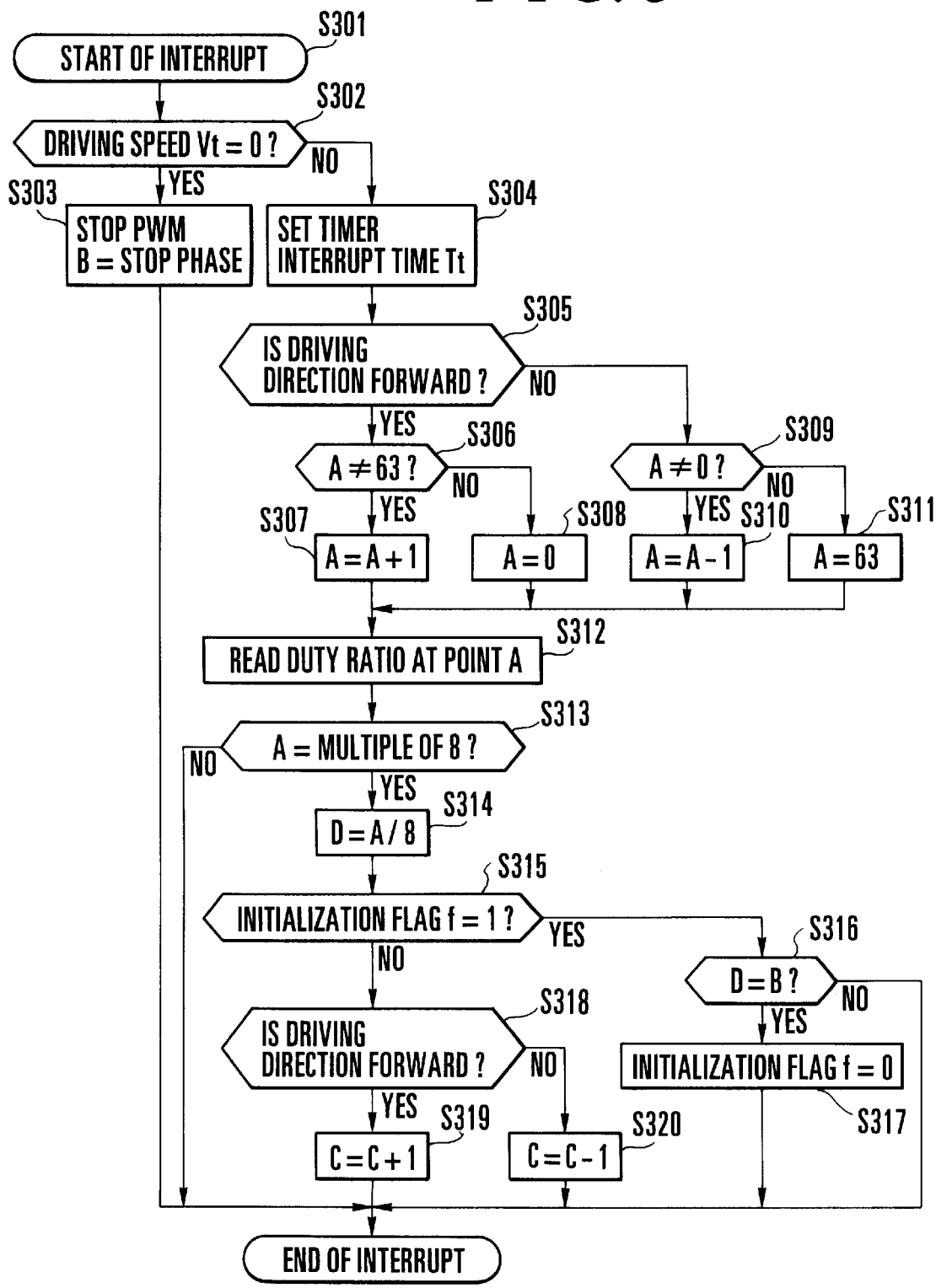
FIG. 3 is a flowchart showing the first embodiment of the present invention and showing the operational flow of a timer interrupt routine for controlling the PWM output required to actually drive the pulse motor.

The operational flow of a timer interrupt routine for controlling the PWM output required to actually drive the pulse motor is shown in FIG. 3.

Referring to FIG. 3, in Step S301, the timer interrupt routine is started. First, in Step S302, it is determined whether the driving speed Vt which is set in the above-described main routine shown in FIG. 2 is "0".

If it is determined in Step S302 that the driving speed Vt is "0" which indicates that the pulse motor need not be driven, the PWM output is stopped in Step S303, and the count value B indicative of the phase state of the stop position of the rotor of the pulse motor at this time (refer to FIG. 19) is stored in the stop position storing part 76 as backup data to be stored when the power source is turned off. However, if it is determined in Step S302 that the driving speed Vt is not "0", the process proceeds to Step S304, in which the timer interrupt time Tt which has been set in Step S204 of FIG. 2 is set.

Then, in Step S305, it is determined whether the driving direction in which to drive the pulse motor, which has been set in Step S203, is forward. If the driving direction is forward, the process proceeds to Step S306, in which it is determined whether the value of the address A is "63". If the value of the address A is not "63", the process proceeds to Step S307, in which the address A is incremented. If the value of the address A is "63", the process proceeds to Step S308, in which the value of the address A is set to "0". This value of the address A indicates which of the sixty-four points of one sine-wave cycle corresponds to a phase position at which the pulse motor is currently placed.

If it is determined in Step S305 that the driving direction in which to drive the pulse motor is not forward, it is determined in Step S309 whether the value of the address A is "0". If the value of the address A is not "0", the process proceeds to Step S310, in which the address A is decremented. If the value of the address A is "0", the process proceeds to Step S311, in which the value of the address A is set to "63". Then, in Step S312, the basic duty ratio data Dn, such as that shown in FIG. 18, which is indicated by the addresses A (for example, "0" to "63") indicative of the phase state of the pulse motor at this time is read from the ROM 7c.

Then, in Step S313, it is determined whether the value of the address A is a multiple of 8. As shown in FIG. 19, one pulse is produced at a time at intervals of a multiple of 8 in one cycle which is divided into sixty-four points, and eight pulse periods constitute one cycle. Accordingly, if it is determined in Step S313 that the value of the address A is not a multiple of 8, this indicates that the rotor is currently moving by one pulse, and the timer interrupt process is brought to an end.

On the other hand, if it is determined in Step S313 that the value of the address A is a multiple of 8, the process proceeds to Step S314, in which an integer obtained by dividing the current value of the address A by eight is stored as the count value D, and a phase position reached by the rotor of the pulse motor to be currently driven is found from phase positions indicated by the count value D in FIG. 19. If this computation is to be performed, the pulse counter 74 shown in FIG. 1 is not needed, and, instead, a memory for storing the result of the computation needs to be incorporated.

Then, in Step S315, it is determined whether the value of the initialization flag f is "1", i.e., whether the power source is on. If the value of the initialization flag f is "1", the process proceeds to Step S316, in which it is determined whether the phase position D found in Step S314 coincides with the phase position B which was previously stored in the stop position storing part 76 when the power source was turned off to stop the driving of the pulse motor in the previous driving operation.

If both phase positions B and D coincide with each other, it is determined that a driving phase and the initial state of the address A for producing the driving phase coincide with each other, and the process proceeds to Step S317. In Step S317, the value of the initialization flag f is set to "0", and the timer interrupt process is brought to an end. On the other hand, if it is determined in Step S316 that both phase positions B and D do not coincide with each other, it is determined that the driving phase and the initial state of the address A for producing the driving phase do not yet coincide with each other, and the process is immediately brought to an end.

If it is determined in Step S315 that the value of the initialization flag f is "0", it is determined that the driving phase and the initial state of the address A for producing the driving phase coincide with each other and preparations for driving the pulse motor are completed (by the processing of Step S317), a normal driving operation is performed. Then, it is determined in Step S318 whether the driving direction in which to drive the pulse motor is forward, and if the driving direction is forward, the process proceeds to Step S319, in which the count value C of the position detecting counter 75 is incremented. If the driving direction is not forward, the process proceeds to Step S320, in which the count value C of the position detecting counter 75 is decremented, and the timer interrupt routine is brought to an end.

As described above, in the first embodiment, a phase position which is reached by the rotor at the time of stoppage of the pulse motor is stored (backed up), and when the pulse motor is to be again activated at a later time, the position detecting counter is held in a stopped state until the phase state of driving current reaches the backed-up phase state. Accordingly, it is possible to prevent the deviation of actual driving of the pulse motor from the count value of the position detecting counter, and it is possible to effect accurate position detection without a special position detecting device.

(Second Embodiment)

The above-described first embodiment is intended to provide a method of storing (backing up) a phase position which is reached by a rotor of a pulse motor at the time of stoppage of the pulse motor, and, when the pulse motor is to be again activated at a later time, holding a position detecting counter in a stopped state until the phase state of driving current reaches the backed-up phase state, thereby preventing the deviation of actual driving of the pulse motor from the count value of the position detecting counter. However, it is also possible to adopt a method of storing (backing up) a phase position which is reached by a rotor of a pulse motor at the time of stoppage of the pulse motor, and, when the driving of the pulse motor is to be again started, exciting the pulse motor at the phase position stored (backed up) at the time of stoppage of the pulse motor, without correcting the count value of the position detecting counter.

Figure 4:
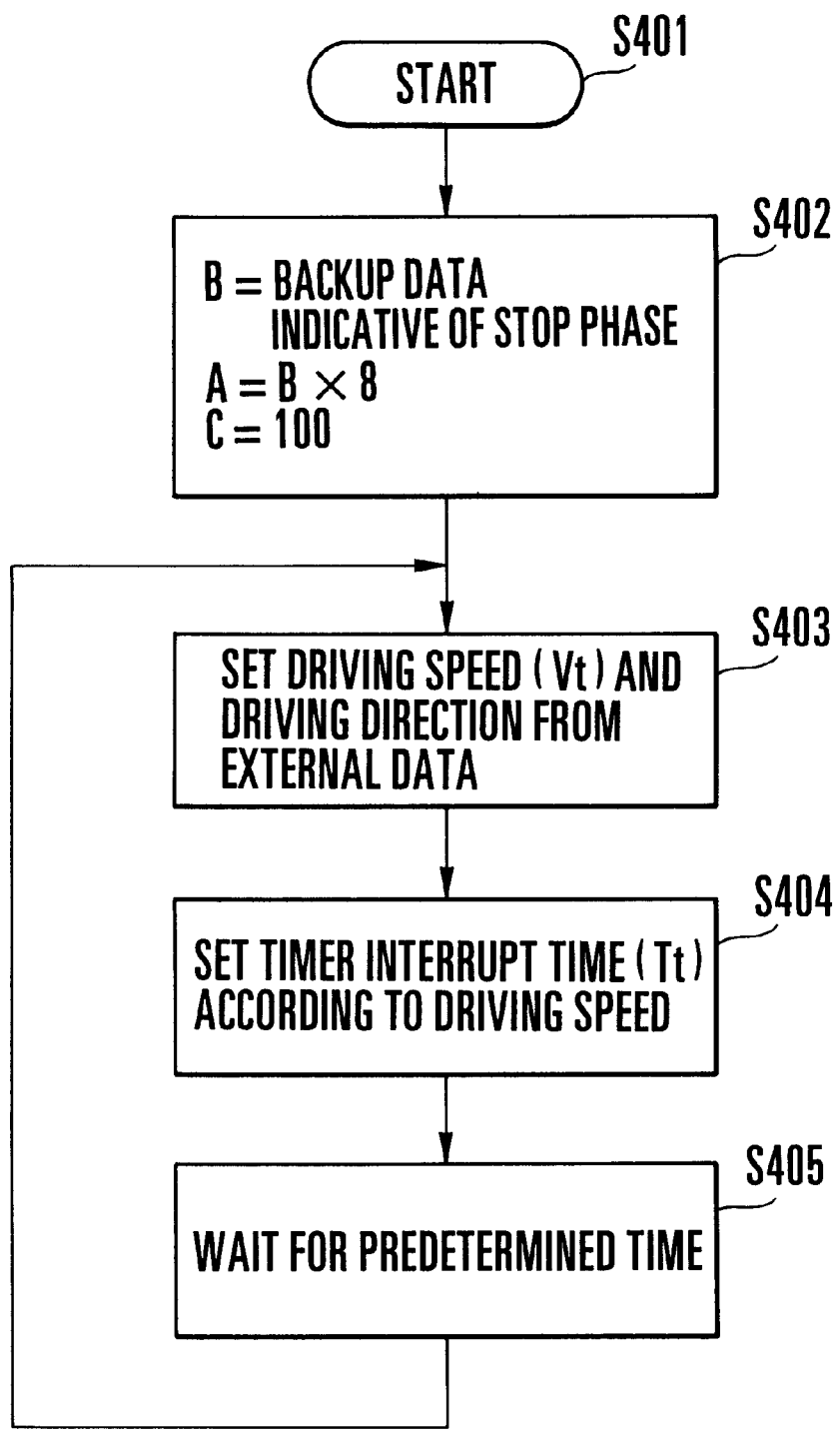
FIG. 4 is a flowchart showing operations to be executed by the microcomputer at the time of a start of driving of the pulse motor and during the driving thereof in a second embodiment of the present invention.
Figure 5:
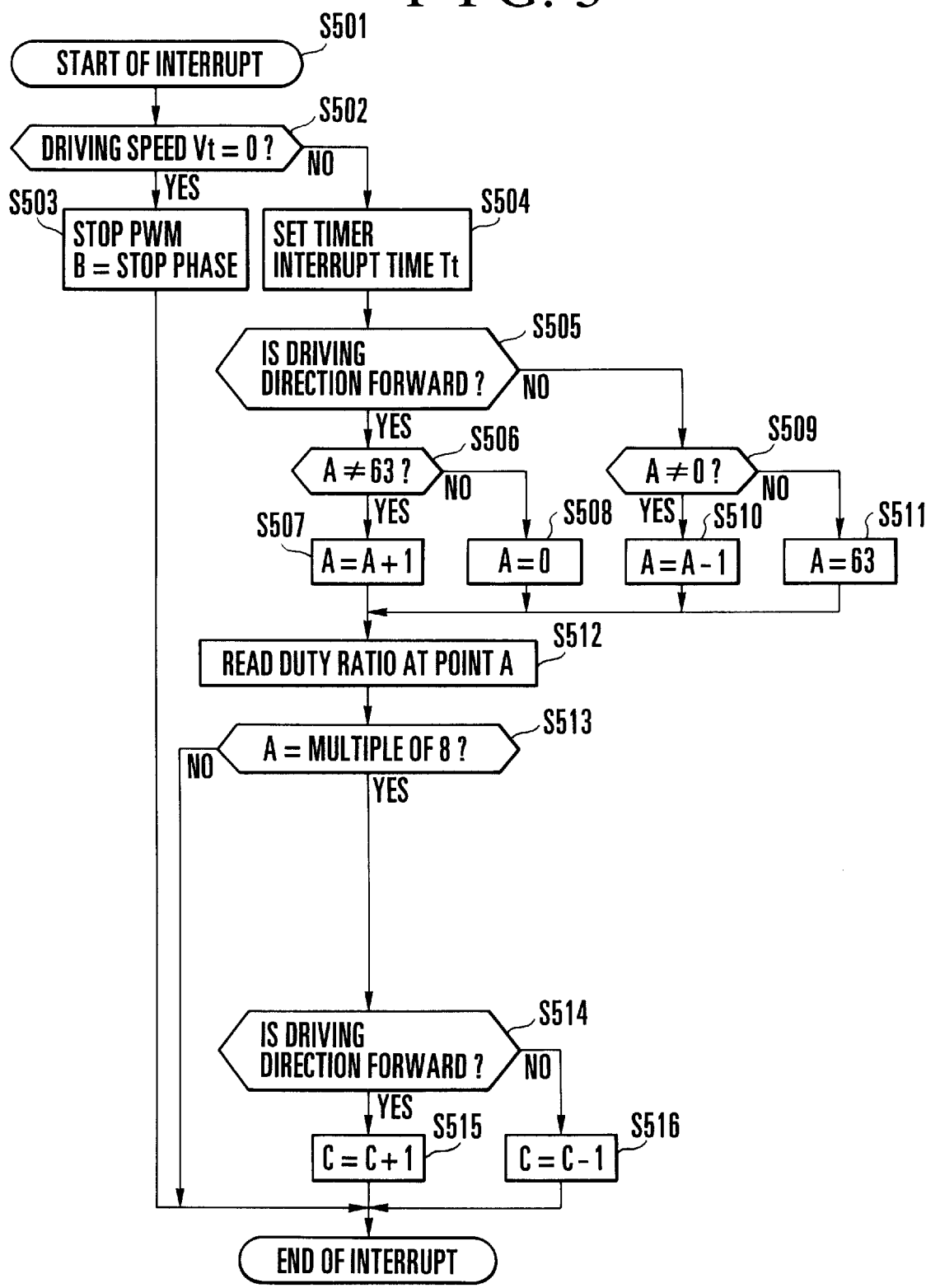
FIG. 5 is a flowchart showing the second embodiment of the present invention and showing the operational flow of a timer interrupt routine for controlling the PWM output required to actually drive the pulse motor.

Specifically, a second embodiment of the present invention is arranged so that if the pulse motor stops at, for example, the phase position B shown in FIG. 19, the driving of the pulse motor is started not at the address A=0 but at the address A=40 when the driving is to be again started at a later time. This operation can be realized by reading backup data representative of the phase position B as a stop phase and setting the address A to the count value B×8 in the initializing process of Step S402 as shown in FIG. 4. The process of the timer interrupt routine is shown in the flowchart of FIG. 5 which excludes Steps S314 to S317 of FIG. 3.

As described above, in the second embodiment of the present invention, a phase position which is reached by the rotor at the time of stoppage of the pulse motor is stored (backed up), and when the pulse motor is to be again activated at a later time, the pulse motor is excited at the stored phase position. Accordingly, it is possible to prevent the deviation of actual driving of the pulse motor from the count value of the position detecting counter by a far simpler arrangement and process, and it is possible to effect accurate position detection without a special position detecting device.

(Third Embodiment)

Figure 6:
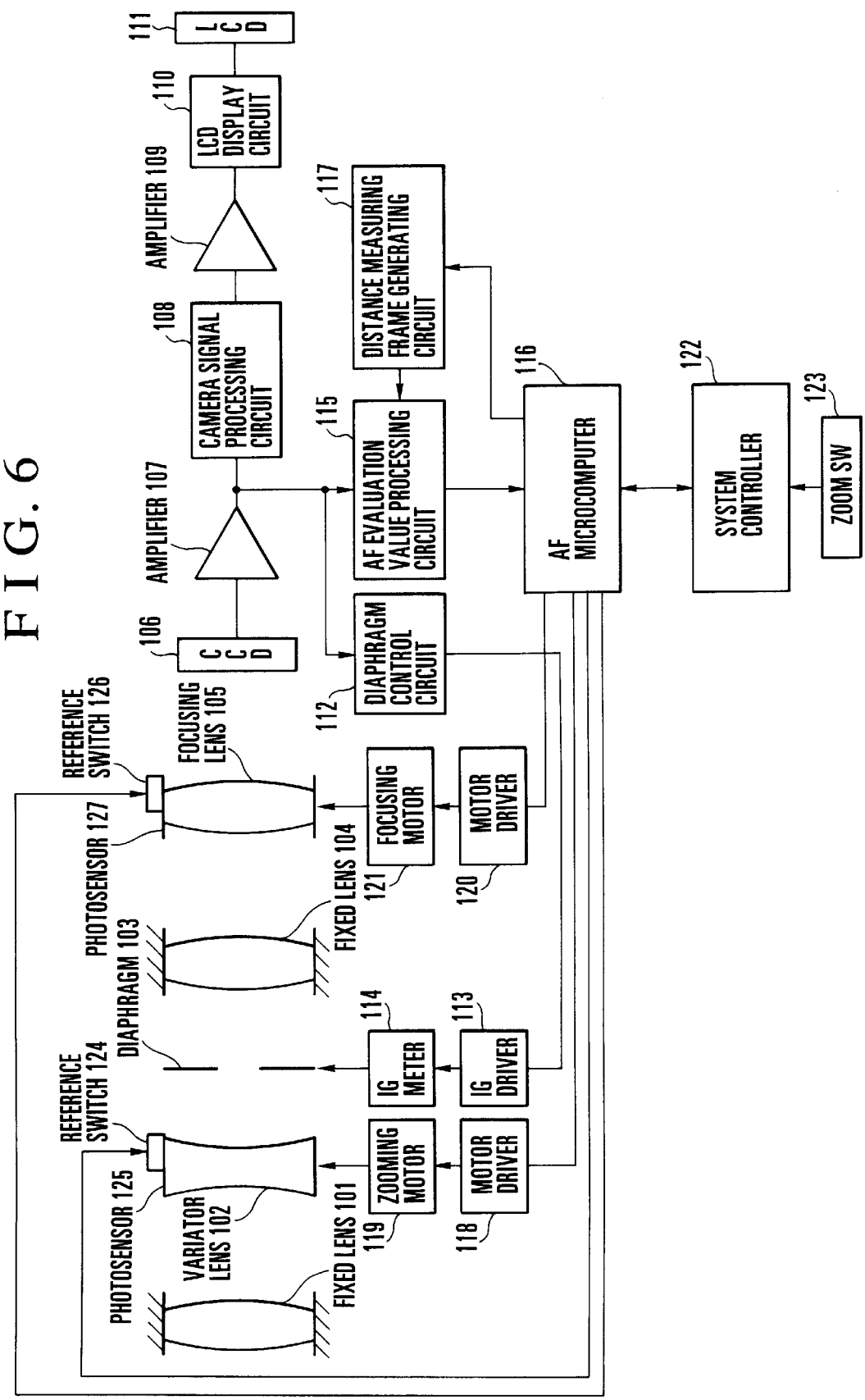
FIG. 6 is a block diagram showing a third embodiment of the present invention and showing an example in which a pulse motor control apparatus according to the present invention is used to drive lenses in an image pickup system such as a video camera.

FIG. 6 is a block diagram showing an example in which a pulse motor control apparatus according to the present invention is used to drive lenses in an image pickup system such as a video camera. In FIG. 6, constituent elements 101 to 105 constitute a simple construction of a so-called inner focus type of lens system.

The lens system shown in FIG. 6 includes the fixed first lens group 101, the second lens group (hereinafter referred to as the variator lens) 102 which is movable along an optical axis of the lens system to perform a magnification varying operation, the diaphragm 103, the fixed third lens group 104, and the fourth lens group (hereinafter referred to as the focusing lens) 105 which is movable along the optical axis to perform both a focus adjusting function and a so-called compensation function which compensates for a movement of a focal plane due to a magnification varying operation. An image pickup surface 106 is formed on an image pickup element such as a CCD.

Figure 7:
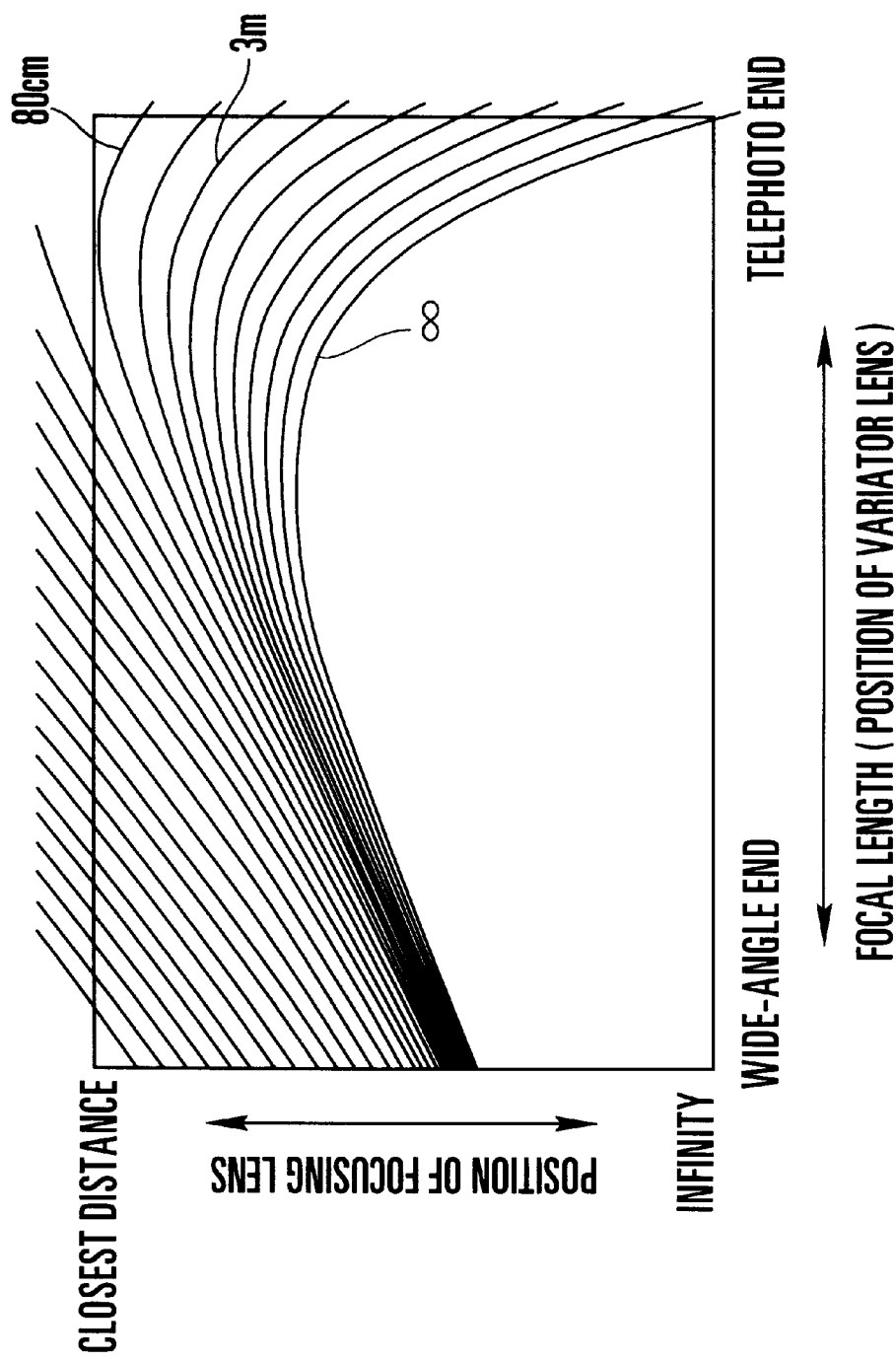
FIG. 7 is a view showing the relation between different focal lengths (variator-lens positions) and focusing-lens positions.

In the lens system which is constructed as shown in FIG. 6, since the focusing lens 105 has both the focus adjusting function and the compensation function, the position of the focusing lens 105 for forming an in-focus image on the image pickup surface 106 differs for different subject distances even if the focal length (the position of the variator lens 102) of the lens system is the same. If a variation in the position of the focusing lens 105 for forming an in-focus image on the image pickup surface is continuously plotted against different subject distances for different focal lengths, the resultant loci are as shown in FIG. 7. During a magnification varying operation, zooming free of defocusing is enabled by selecting an in-focus locus from the loci shown in FIG. 7 according to the subject distance and moving the focusing lens 105 along the selected locus.

A plurality of pieces of locus information such as those shown in FIG. 7 are previously stored in a lens control microcomputer in a particular form, and it is general practice to select an in-focus locus according to the relative position between the focusing lens 105 and the variator lens 102 and perform zooming while tracing the selected locus.

However, to realize such a tracking method, it is necessary to reset the values of lens position counters which indicate the positions of the respective lenses 105 and 102, to particular values. If the values of the lens position counters deviate, it becomes impossible to correctly read cam-locus information obtained from a coordinate system indicative of the combinations of variator-lens positions and focus-lens positions which are stored in the microcomputer, so that it becomes impossible to accurately trace an in-focus locus during a magnification varying operation.

To avoid this problem, it is common practice to use the art of moving the variator lens 102 and the focusing lens 105 to their predetermined positions and resetting their respective lens position counters before the start of a normal operation after a power source is turned on. In such a case, it is general practice that the mounting positions of photodiodes incorporated in the lens system are used as the predetermined positions. Specifically, lens positions which are reached by the lenses 102 and 105 when variations appear in the output signals from the respective photodiodes are set as lens-reset positions, and the values of the respective lens position counters are set to the values determined by the balance adjustment of an optical system.

During a lens-position resetting operation, no picked-up image is outputted because a large defocus occurs, and after the completion of the lens-position resetting operation, a picked-up image is outputted.

In addition, even after the completion of the operation of resetting the respective lens position counters, the outputting of the picked-up image continues to be inhibited and the respective lenses are returned to positions where they were located before the power source was turned on, thereby preventing occurrence of a variation in an angle of view or the like due to the lens-position resetting operation.

Pulse motors are used as motors for driving the respective lenses. Pulse motors have a constant rotational angle per step pulse and can realize position detection merely by incrementing the step pulse, so that no special encoder for position detection is needed.

Referring back to FIG. 6, reference switches 124 and 126 are arranged to detect whether the variator lens 102 and the focusing lens 105 are located at their reference positions. In the third embodiment, the reference switches 124 and 126 are respectively provided on the lenses 102 and 105 together with photosensors 125 and 127. These reference switches 124 and 126 are respectively secured to the variator lens 102 and the focusing lens 105, and the reference switches 124 and 126 move integrally with these lens groups 102 and 105 while the lens groups 102 and 105 are moving in parallel with the optical axis of the lens system. Each of the reference switches 124 and 126 performs the operation of blocking or transmitting the output light of the corresponding one of the photosensors 125 and 127 according to whether the corresponding one of the lens groups 102 and 105 has passed the vicinity of the middle point in its movable range.

A light detecting part of each of the photosensors 125 and 127 outputs a signal of "1" or "0" according to whether the output light of the corresponding one of the photosensors 125 and 127 is blocked or transmitted. Thus, it is possible to detect whether each of the lens groups 102 and 105 is located at the reference position which is a position where a variation appears in the level of the output signal of the corresponding one of the photosensors 125 and 127.

Figure 8:
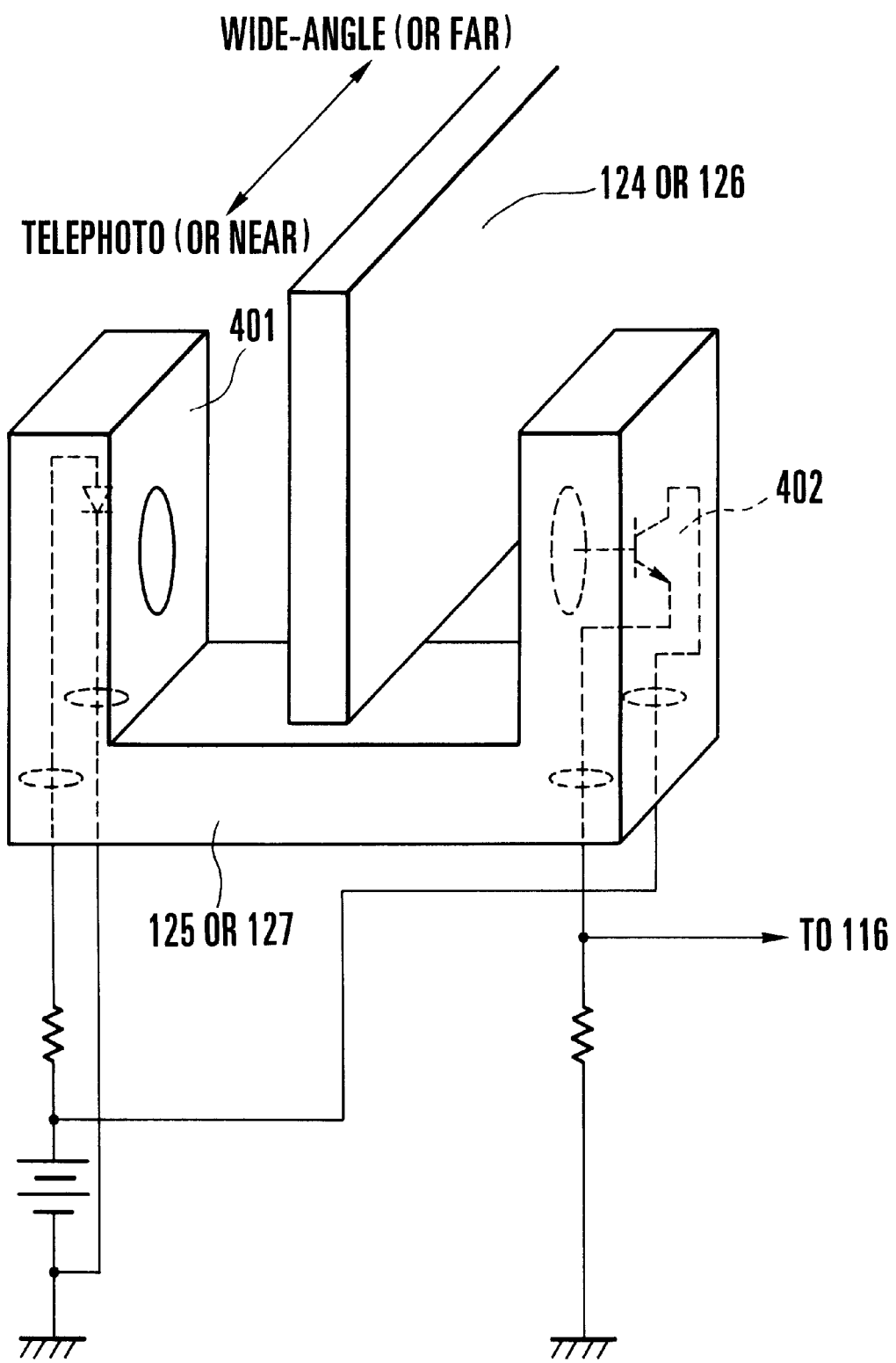
FIG. 8 is a view showing the construction of a reset switch which operates as a lens position counter.

FIG. 8 is a view showing the construction of a reset switch which operates as such a lens position counter. A light emitting portion 401 and a light receiving portion 402 constitute the photosensor 125 (or 127), and if the optical path from the light emitting portion 401 to the light receiving portion 402 is blocked by the reference switch (light blocking plate) 124 (or 126) which moves in parallel with the optical axis together with the lens group 102 (or 105), the output signal of the light receiving portion 402 goes to a low level. Otherwise, the output signal of the light receiving portion 402 goes to a high level.

Subject light which has passed through the above-described lens system is focused on and is photoelectrically converted into a video signal by the image pickup surface 106 of the image pickup element such as a CCD. This converted video signal is amplified by an amplifier or impedance converter 107 and is inputted into a camera signal processing circuit 108. The video signal is subjected to predetermined signal processing in the camera signal processing circuit 108, and is then amplified to a prescribed level by an amplifier 109. The amplified signal is processed by an LCD display circuit 110 and is displayed on an LCD 111 as a picked-up image.

The video signal which has been amplified by the amplifier or impedance converter 107 is also sent to a diaphragm control circuit 112 and an AF evaluation value processing circuit 115. The diaphragm control circuit 112 drives an IG driver 113 and an IG meter 114 according to the input level of the video signal, thereby controlling the diaphragm 103 to make adjustment of the amount of light. The AF evaluation value processing circuit 115 extracts only a high-frequency component of the video signal within a distance measuring frame according to a gate signal supplied from a distance measuring frame generating circuit 117, and performs predetermined processing for generating an AF evaluation signal.

An AF microcomputer 116 exerts control over the driving of each of the lens groups 102 and 105 as well as distance-measuring-frame control for varying a distance measuring area, according to an AF evaluation signal strength supplied from the AF evaluation value processing circuit 115. In addition, the AF microcomputer 116 performs communication with a system control microcomputer (hereinafter referred to as the system controller) 122 so that information relative to a zoom switch 123, which is read into the system controller 122 through A/D conversion or the like, magnification-varying-operation information such as a zooming direction or a focal length for zooming to be controlled by the AF microcomputer 116 and other information are communicated between the AF microcomputer 116 and the system controller 122. (The zoom switch 123 is a zoom switch which is formed as one unit and outputs a voltage according to the rotational angle of a manipulating member, and variable-speed zooming is performed according to the output voltage.)

Motor drivers 118 and 120, whose current waveforms can be varied, output driving energy to lens driving motors 119 and 121 according to instructions to drive the variator lens 102 and the focusing lens 105, both instructions being outputted from the AF microcomputer 116. The lens driving motors 119 and 121 are provided for driving the variator lens 102 and the focusing lens 105, respectively.

A method of driving the lens driving motors 119 and 121 will be described below. In the following description, by way of example, it is assumed that both motors 119 and 121 are stepping motors.

The AF microcomputer 116 determines a driving speed for the zooming motor 119 and a driving speed for the focusing motor 121 by program processing, and supplies the respective driving speeds to the motor driver 118 for the zooming motor 119 and to the motor driver 120 for the focusing lens motor 121, in the form of rotation frequency signals for the respective stepping motors 119 and 121. The AF microcomputer 116 also supplies drive/stop instructions for the respective motors 119 and 121 and rotating-direction instructions for the respective motors 119 and 121 to the corresponding motor drivers 118 and 120.

The drive/stop signal and the rotating-direction signal for the zooming motor 119 are primarily outputted according to the state of the zoom switch unit 123, whereas those for the focusing lens motor 121 are outputted according to a drive instruction which is determined by processing executed in the AF microcomputer 116 during AF or zooming. Each of the motor drivers 118 and 120 sets the phase order of four motor excitation phases to a phase order for forward rotation or a phase order for reverse rotation according to the received rotating-direction signal. In addition, each of the motor drivers 118 and 120 outputs voltages (or currents) for the respective four motor excitation phases while varying the voltages (or the currents), according to the received rotation frequency signal, thereby controlling the rotating direction and the rotation frequency of the corresponding one of the motors 119 and 121. In addition, the respective motor drivers 119 and 121 turn on/off their outputs to the motors 119 and 121 according to the received drive/stop instructions.

Figure 9:
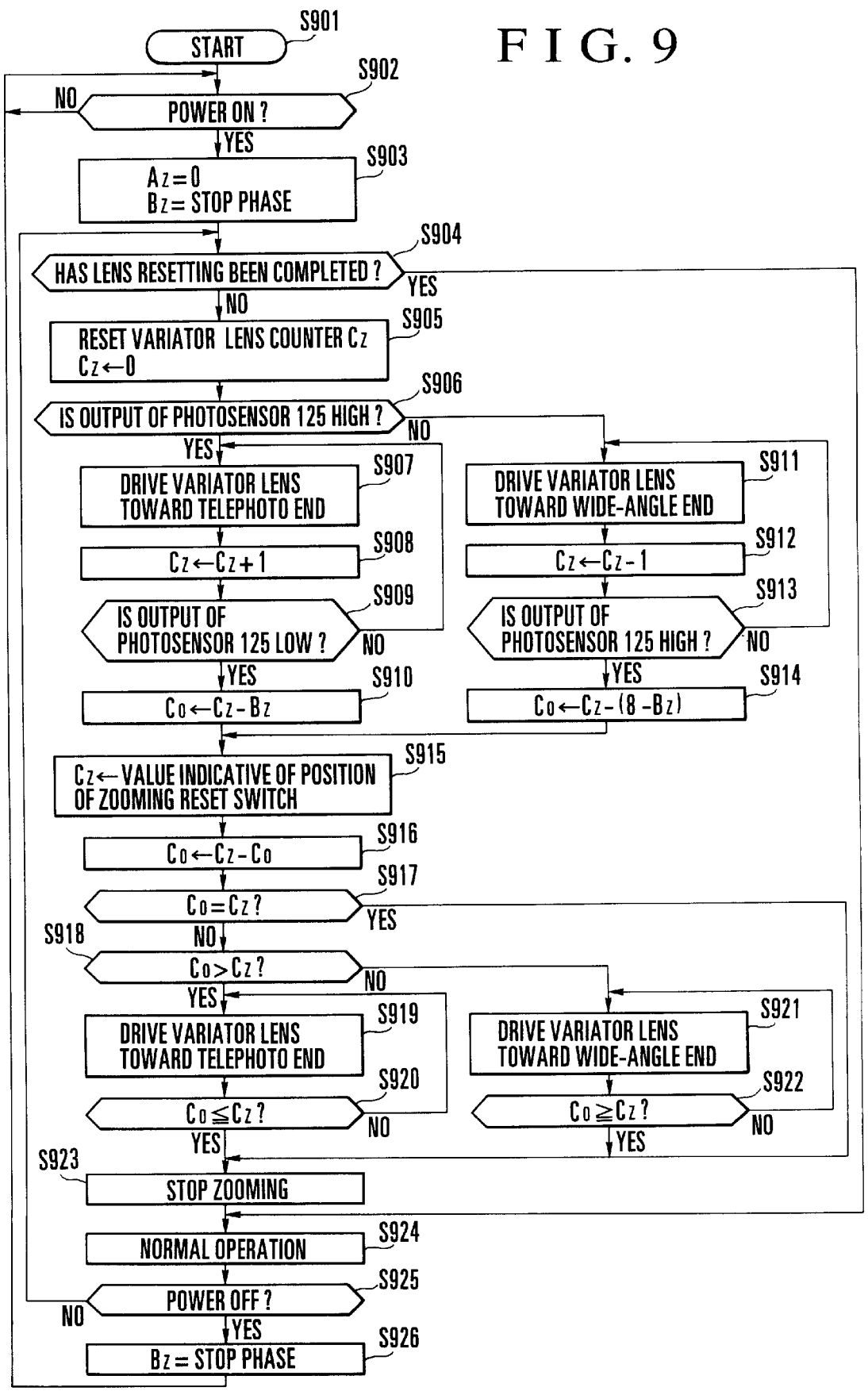
FIG. 9 is a flowchart showing a third embodiment of the present invention and aiding in describing the resetting operation of the lens position counter, the flowchart being processed in an AF microcomputer for lens control.

FIG. 9 is a flowchart aiding in describing the resetting operation of the above-described lens position counter for the variator lens 102. This flowchart is processed in the AF microcomputer 116 for lens control.

In FIG. 9, if the execution of the process is started in Step S901, it is determined in Step S902 whether the power source is turned on. If the power source is not turned on, the process waits until the power source is turned on. If the power source is turned on, initial setting is performed in Step S903. In Step S903, the value of a counter Az for determining the phase state of driving current for reading duty ratio data from the AF microcomputer 116 is set to "0", and the stop phase of a motor-driving stop position which was stored when the power source was turned off in the previous driving operation is set to Bz.

Then, in Step S904, it is determined whether the resetting operation of the lens position counter has been completed. If the resetting operation has been completed, the process jumps to Step S924. If the resetting operation has not yet been completed, the process proceeds to Step S905, in which a lens-position detecting counter Cz for the variator lens 102 is cleared, and in Step S906, it is determined whether the output signal of the photosensor 125 is at a high level.

For example, if the boundary between light blocking and light transmission lies nearly at the middle of the movable range of the variator lens 102, it can be determined whether the boundary lies on a more telephoto or wide-angle side than the current position of the variator lens 102, from the state of the output signal of the photosensor 125. Referring to FIG. 8 by way of example, if the output signal of the photosensor 125 is at a low level, the optical path from the light emitting portion 401 to the light receiving portion 402 is blocked and the variator lens 102 is located on a more telephoto side than the aforesaid boundary. Accordingly, if the variator lens 102 is made to move toward a more wide-angle side, the output signal of the photosensor 125 can be varied from the low level to the high level. On the other hand, if the output signal of the photosensor 125 is at the high level, the reverse operation is executed.

Accordingly, if it is determined in Step S906 of FIG. 9 that the output signal of the photosensor 125 is at the high level, the process proceeds to Step S907, in which the variator lens 102 is made to move toward the more telephoto side in order to detect the boundary. In Step S908, the lens-position detecting counter Cz for the variator lens 102 is incremented in synchronism with the step pulse of the zooming motor 119. Then, in Step S909, it is determined whether the output signal of the photosensor 125 has changed to the low level, and if it has not yet changed to the low level, the process returns to Step S907, in which the above-described operation is repeated.

If it is determined in Step S909 that the output signal of the photosensor 125 has changed to the low level, the process proceeds to Step S910. In Step S910, the value Bz representative of the phase state of the motor-driving stop position is subtracted from the value of the lens-position detecting counter Cz for the variator lens 102, and the result is stored in a memory Co. In other words, the value of Cz−Bz is the value obtained by subtracting the number of phase pulses indicative of the motor-driving stop position from the number of pulses of the driving current outputted from the AF microcomputer 116.

This value indicates the number of step pulses of the zooming motor 119 between a reset-switch position where the reset switch using the photosensor 125 is located and a variator-lens position where the variator lens 102 is located before the resetting operation is performed immediately after the power source is turned on. In other words, the value represents the distance between the position where the variator lens 102 is located before the power source is turned on and the reset-switch position where the reset switch using the photosensor 125 is located.

On the other hand, if it is determined in Step S906 that the output signal of the photosensor 125 is at the low level, the process proceeds to Steps S911 and performs, through Steps S911, S912, S913 and S914, operations and a decision which are opposite to the above-described ones of Steps S907, S908, S909 and S910. In these steps S911, S912, S913 and S914, after a variation in the level of the output signal of the photosensor 125 is checked in Step S913, the calculation result of "Cz−(8−Bz)" is stored in the memory Co in Step S914.

The value calculated in Step S914 is the value obtained by subtracting the value of (8− the number of phase pulses indicative of the stop position) from the number of pulses of driving current outputted from the AF microcomputer 116. This value indicates the number of step pulses of the zooming motor 119 between the reset-switch position and the variator-lens position where the variator lens 102 is located before the resetting operation is performed immediately after the power source is turned on. In other words, the value represents the distance between the position where the variator lens 102 is located before the power source is turned on and the reset-switch position where the reset switch using the photosensor 125 is located.

Then, in Step S915, the value of the lens-position detecting counter Cz at this time is temporarily stored in the memory Co, and a numerical value representative of the reset-switch position measured or determined in advance is inputted into the lens-position detecting counter Cz. (For example, the numerical value is obtained by converting the reset-switch position measured from an origin determined in terms of optical design which origin lies in the movable range of the variator lens 102, into the number of step pulses of the zooming motor 119.) Upon the completion of the processing of Step S915, the resetting operation of the lens-position detecting counter Cz for the variator lens 102 is completed.

Then, in Step S916, the value of the memory Co is subtracted from the value of the lens-position detecting counter Cz which is newly determined in Step S915, and the obtained result is inputted into the memory Co. In Step S916, the initial absolute position of the variator lens 102 is calculated on the basis of the reset-switch position measured from the origin (by subtracting the distance between the reset-switch position and the variator-lens position from the reset-switch position measured from the origin.) Accordingly, if the variator lens 102 is made to move until the value of the lens-position detecting counter Cz reaches the value of the memory Co, the variator lens 102 can be moved to a position where the variator lens 102 was located before the power source was turned on.

Incidentally, if the process passes through Steps S911, S912, S913 and S914 of the third embodiment, a value to be stored in the memory Co in Step S914 is negative. If this negative value is substituted into the expression of Step S916 without modification, the result becomes greater than the value of the lens-position detecting counter Cz which has been calculated in Step S915, and means that the initial position of the variator lens 102 is located on a more telephoto side than the reset-switch position. Accordingly, whether the aforesaid value is negative does not matter.

The initial lens position of the variator lens 102 is obtained in the above-described manner, and the process proceeds to Step S917. In Step S917, it is determined whether the return destination position of the variator lens 102 which is stored in the memory Co and the reset position of the variator lens 102 which is stored in the lensposition detecting counter Cz are equal to each other. If both positions are equal, it is determined that the variator lens 102 is previously located at the return destination position, the process jumps to Step S923.

On the other hand, if the result of the decision made in Step S917 is false, it is determined in Step S918 whether the value of the return destination position stored in the memory Co is greater than the value of the current variator-lens position stored in the lens-position detecting counter Cz. If the value of the return destination position is greater than the value of the current variator-lens position, it is determined that a direction in which to return the variator lens 102 is the telephoto direction, and the process proceeds to Step S919. In Step S919, the variator lens 102 is driven in the telephoto direction. Then, in Step S920, it is confirmed whether the variator lens 102 has arrived at the return destination position stored in the memory Co. If the arrival of the variator lens 102 at the return destination position is confirmed, the process proceeds to Step S923, whereas if the variator lens 102 has not yet arrived at the return destination position, the process returns to Step S919.

If the result of the decision made in Step S918 is false, it is determined that the return destination position of the variator lens 102 is located on a more wide-angle side than the current position of the variator lens 102, and the process proceeds to Step S921. Through Steps S921 and S922, the process performs an operation and a decision which are opposite to the corresponding ones of Steps S919 and S920. If it is confirmed in Step S922 that the variator lens 102 has arrived at the return destination position, the process proceeds to Step S923.

In Step S923, the driving of the variator lens 102 is stopped. Then, in Step S924, after an image is outputted, a normal image pickup operation is executed. After that, it is determined in Step S925 whether the image pickup operation is completed and the power source is shut off. If the power source is not shut off, the process returns to Step S904, whereas if the power source is shut off, the process proceeds to Step S926, in which the phase state of driving current that corresponds to the stop position of the rotor of the zooming motor 119 at this time is stored (backed up) in the memory Bz.

Figure 10:
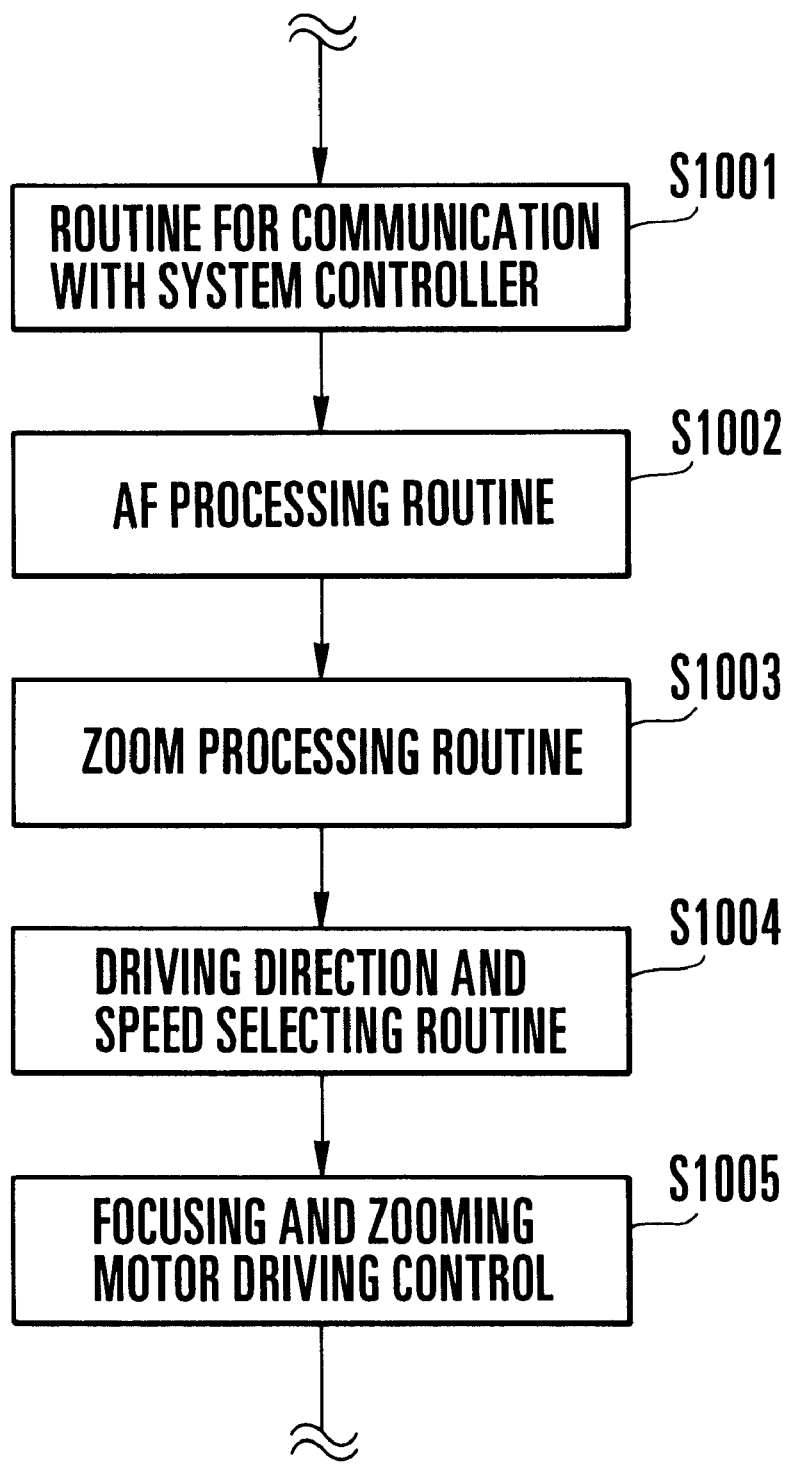
FIG. 10 is a flowchart aiding in describing a normal operation executed in Step S924 of FIG. 9.

FIG. 10 is a control flowchart for carrying out the third embodiment, showing the normal operation of Step S924 of FIG. 9. This control is processed in the AF microcomputer 116 for lens control. Step S1001 is a routine for communication with the system controller 122, in which information relative to the zoom switch unit 123 and magnification-varying-operation information such as the position of the variator lens 102 are communicated between the AF microcomputer 116 and the system controller 122.

In the AF processing routine of Step S1002, a sharpness signal which constitutes an AF evaluation signal is formed from a signal obtained from the AF evaluation value processing circuit 115, and automatic focus adjustment processing is performed according to a variation in the AF evaluation signal. Step S1003 is a zoom processing routine which performs processing on a compensation operation for maintaining an in-focus state during a magnification varying operation. This zoom processing routine calculates a driving direction in which to drive the focusing lens 105 and a driving speed at which to drive the focusing lens 105, so that the focusing lens 105 can trace cam loci such as those shown in FIG. 7.

In Step S1004, selection is made from among the driving directions and the driving speeds for the variator lens 102 and the focusing lens 105 which have been calculated in Step S1002 and Step S1003, according to whether to execute an AF operation or a magnification varying operation, and setting is performed so as not to drive the lenses 102 and 105 beyond their respective telephoto ends, wide-angle ends, closest-distance ends or infinity ends all of which are previously set by software so as not to prevent the lenses 102 and 105 from coming into contact with end portions of their respective mechanical portions.

In Step S1005, the AF microcomputer 116 outputs control signals to the motor driver 118 for the variator lens 102 and the motor driver 120 for the focusing lens 105 according to the information which has been determined in Step S1004 as to the driving directions and the driving speeds for the variator lens 102 and the focusing lens 105, thereby controlling the respective motors 119 and 121 to drive or stop the variator lens 102 and the focusing lens 105. After the completion of the processing of Step S1005, the process returns to Step S925 of FIG. 9. The entire processing shown in FIG. 10 is executed in synchronism with each vertical synchronizing period (the processing waits for the arrival of the next vertical synchronizing signal during the return of the process from Step S925 to Step S904 shown in FIG. 9).

Figure 11:
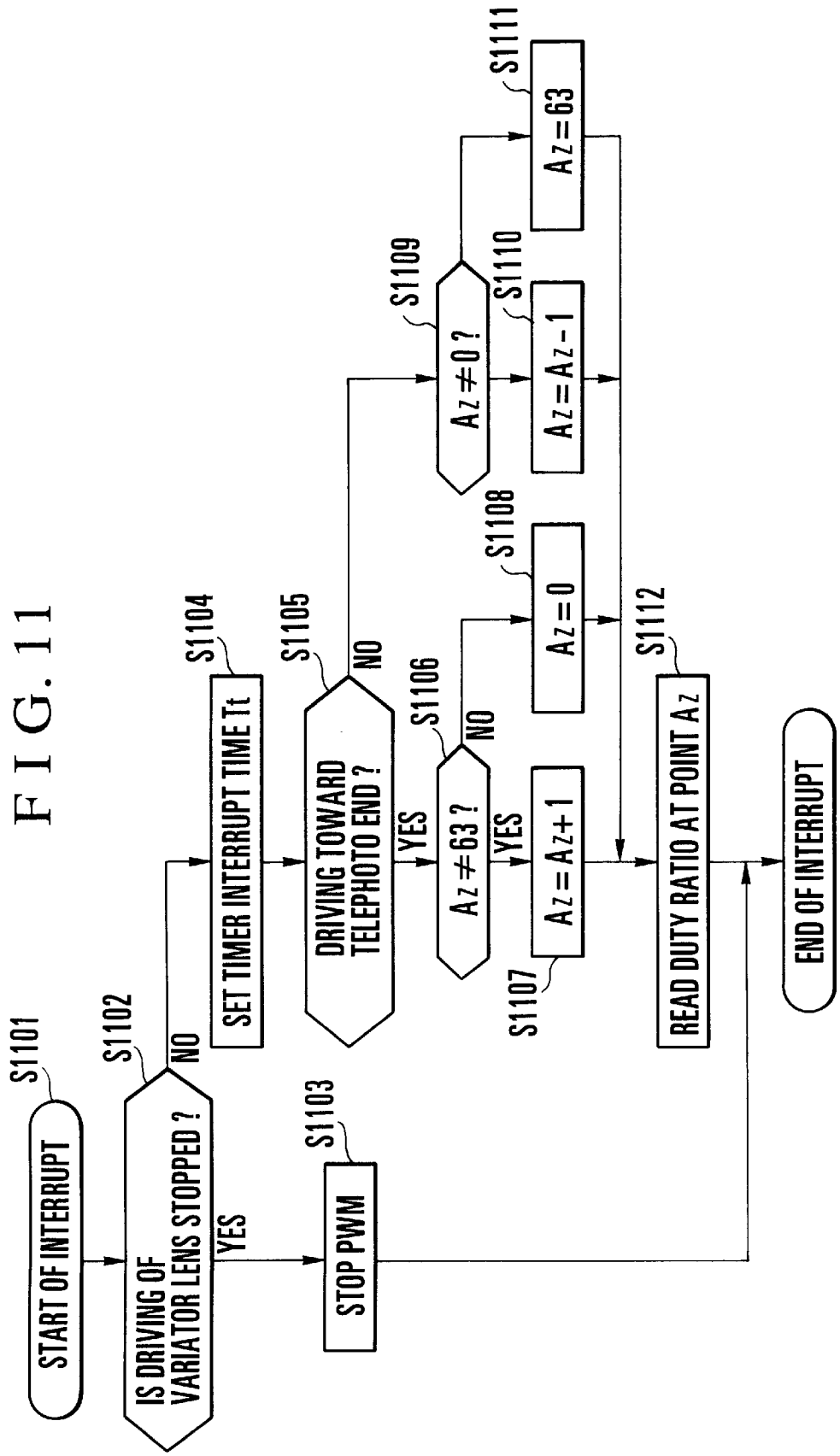
FIG. 11 is a flowchart showing the third embodiment of the present invention and showing the flow of operation of a timer interrupt routine.

On the basis of the driving speeds and the driving pulses which have been set in Step S1005, the AF microcomputer 116 performs an interrupt process such as that shown in FIG. 11 which will be described below, thereby driving the variator lens 102 and the focusing lens 105. FIG. 11 is a flowchart representing the feature of the third embodiment, and shows the flow of operation of a timer interrupt process relative to the variator lens 102. The timer interrupt process causes an interrupt at a timing determined by the driving speed which has been set in Step S1004 of FIG. 10, and outputs an interrupt driving pulse at a shorter period for a faster driving speed and at a longer period for a slower driving speed.

Referring to FIG. 11, in Step S1101, the timer interrupt routine is started, and in Step S1102, it is determined whether the driving speed which has been set in the above-described main routine shown in FIG. 10 is "0". If the driving speed is "0", it is determined that the pulse motor 119 need not be driven, and the process proceeds to Step S1103, in which the output from the PWM unit is stopped. On the other hand, if the driving speed is not "0", the process proceeds to Step S1104, in which the timer interrupt time Tt according to the driving speed which has been set in Step S1004 of FIG. 10 is set.

Then, in Step S1105, it is determined whether the driving direction which has been set for the zooming motor 119 in Step S1004 of FIG. 10 is the telephoto direction. If the driving direction is the telephoto direction, the process proceeds to Step S1106, in which it is determined whether the value of the counter Az is "63". If the value of the counter Az is not "63", the process proceeds to Step S1107, in which the value of the counter Az is incremented, whereas if the value of the counter Az is "63", the process proceeds to Step S1108, in which the value of the counter Az is set to "0". This value of the counter Az indicates which of the sixty-four points of one sine-wave cycle corresponds to a phase position which is currently reached by the rotor of the pulse motor 119.

If it is determined in Step S1105 that the driving direction for the zooming motor 119 is not the telephoto direction, the process proceeds to Step S1109, in which it is determined whether the value of the counter Az is "0". If the value of the counter Az is not "0", the process proceeds to Step S1110, in which the value of the counter Az is decremented, whereas if the value of the counter Az is "0", the process proceeds to Step S1111, in which the value of the counter Az is set to "63". Then, in Step S1112, the basic duty ratio data Dn, such as that shown in FIG. 18, which is indicated by the value of the counter Az (for example, "0" to "63") indicative of the phase state of the pulse motor 119 at this time is read.

As is apparent from the above description, in the third embodiment, during the initial operation of resetting the lens-position detecting counter for the variator lens 102 when the power source is turned on, the number of pulses to be applied to the pulse motor 119 while the variator lens 102 is moving from its movement start position to the position of the photosensor 125 is calculated in terms of a stored (backup) value indicative of the previous stop position of the pulse motor 119. Accordingly, it is possible to prevent the deviation of actual driving of the pulse motor 119 from the count value of the lens-position detecting counter, and it is possible to effect accurate position detection without a special position detecting device.

(Fourth Embodiment)

Although the above-described third embodiment is intended for the operation of resetting the position counter for the variator lens 102, this resetting operation can also be likewise applied to the resetting of the focusing lens 105. The resetting operation of the focusing lens 105 according to a fourth embodiment will be described below with reference to FIG. 12.

Figure 12:
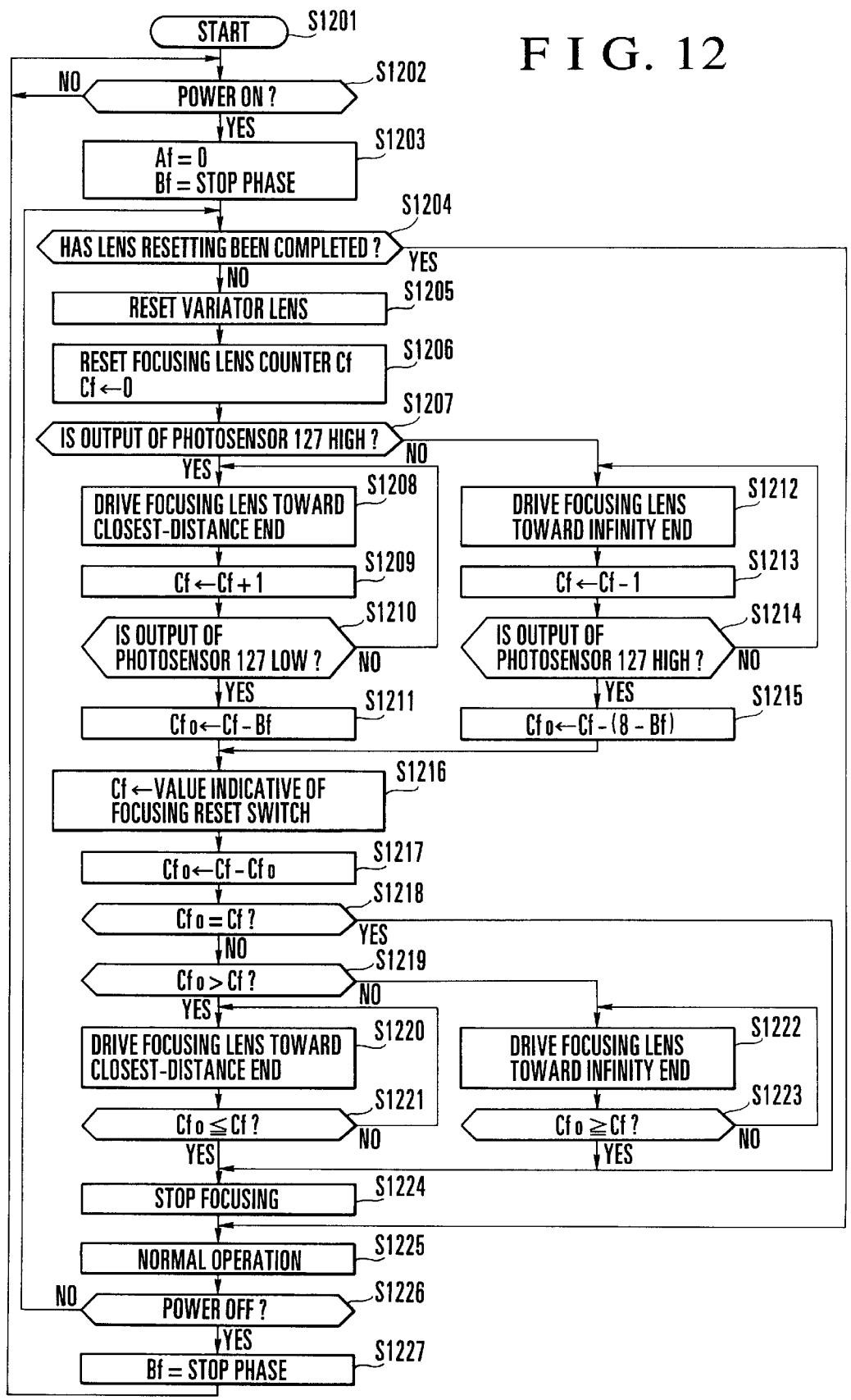
FIG. 12 is a flowchart showing a fourth embodiment of the present invention and aiding in describing the resetting operation of a lens position counter, the flowchart being processed in the AF microcomputer for lens control.

Referring to FIG. 12, the execution of the process is started in Step S1201, and, in Step S1202, the process waits until the power source is turned on. If the power source is turned on, initial setting is performed in Step S1203. In Step S1203, the value of a counter Af for determining the phase state of driving current for reading duty ratio data from the AF microcomputer 116 is set to "0", and the stop phase of a motor-driving stop position which was stored when the power source was turned off in the previous driving operation is set to Bf.

Then, in Step S1204, it is determined whether the resetting operation of the lens position counter for the focusing lens 105 has been completed. If the resetting operation has been completed, the process jumps to Step S1225. If the resetting operation has not yet been completed, the process proceeds to Step S1205, in which the resetting operation of the variator lens 102 shown in FIG. 9 is executed. The next steps S1206 to S1215 are similar to Steps S905 to S914 of FIG. 9, and are provided for detecting the reset-switch position of the focusing lens 105. Specifically, in Step S1206, a lens-position detecting counter Cf for the focusing lens 105 is cleared, and in Step S1207, it is determined whether the output signal of the photosensor 127 is at a high level.

For example, if the boundary between light blocking and light transmission lies nearly at the middle of the movable range of the focusing lens 105, it can be determined whether the boundary lies on a closer-distance side or a more infinity side than the current position of the focusing lens 105, from the state of the output signal of the photosensor 127. Referring to FIG. 8 by way of example, if the output signal of the photosensor 127 is at a low level, the optical path from the light emitting portion 401 to the light receiving portion 402 is blocked and the focusing lens 105 is located on a closer-distance side than the aforesaid boundary. Accordingly, if the focusing lens 105 is made to move toward its infinity side, the output signal of the photosensor 127 can be varied from the low level to the high level. On the other hand, if the output signal of the photosensor 127 is at the high level, the reverse operation is executed.

Accordingly, if it is determined in Step S1207 of FIG. 12 that the output signal of the photosensor 127 is at the high level, the process proceeds to Step S1208, in which the focusing lens 105 is made to move toward its closest-distance side in order to detect the boundary. In Step S1209, the lens-position detecting counter Cf for the focusing lens 105 is incremented in synchronism with the step pulse of the focusing motor 121. Then, in Step S1210, it is determined whether the output signal of the photosensor 127 has changed to the low level, and if it has not yet changed to the low level, the process returns to Step S1208, in which the above-described operation is repeated.

If it is determined in Step S1210 that the output signal of the photosensor 127 has changed to the low level, the process proceeds to Step S1211. In Step S1211, the value Bf representative of the phase state of the motordriving stop position is subtracted from the value of the lens-position detecting counter Cf for the focusing lens 105, and the result is stored in a memory Cfo. In other words, the value of Cf−Bf is the value obtained by subtracting the number of phase pulses indicative of the motor-driving stop position from the number of pulses of the driving current outputted from the AF microcomputer 116.

This value indicates the number of step pulses of the focusing motor 121 between a reset-switch position where the reset switch using the photosensor 127 is located and a focusing-lens position where the focusing lens 105 is located before the resetting operation is performed immediately after the power source is turned on. In other words, the value represents the distance between the position where the focusing lens 105 is located before the power source is turned on and the reset-switch position where the reset switch using the photosensor 127 is located.

On the other hand, if it is determined in Step S1207 that the output signal of the photosensor 127 is at the low level, the process proceeds to Steps S1212 and performs, through Steps S1212, S1213, S1214 and S1215, operations and a decision which are opposite to the above-described ones of Steps S1208, S1209, S1210 and S1211. In these steps S1212, S1213, S1214 and S1215, after a variation in the level of the output signal of the photosensor 127 is checked in Step S1214, the calculation result of "Cf−(8−Bf)" is stored in the memory Cfo in Step S1215.

Each of the values of "Cf−Bf" calculated in Step S1211 and the values of "Cf−(8−Bf)" calculated in Step S1215 indicates the number of step pulses of the focusing motor 121 between the reset-switch position and the focusing-lens position where the focusing lens 105 is located before the resetting operation is performed immediately after the power source is turned on. In other words, each of the values represents the distance between the position where the focusing lens 105 is located before the power source is turned on and the reset-switch position where the reset switch using the photosensor 127 is located.

Then, in Step S1216, the value of the lens-position detecting counter Cf at this time is temporarily stored in the memory Cfo, and a numerical value representative of the reset-switch position measured or determined in advance is inputted into the lens-position detecting counter Cf. (For example, the numerical value is obtained by converting the reset-switch position measured from an origin determined in terms of optical design which origin lies in the movable range of the focusing lens 105, into the number of step pulses of the focusing motor 121.) Upon the completion of the processing of Step S1216, the resetting operation of the lens-position detecting counter Cf for the focusing lens 105 is completed.

Then, in Step S1217, the value of the memory Cfo is subtracted from the value of the lens-position detecting counter Cf which is newly determined in Step S1216, and the obtained result is inputted into the memory Cfo. In Step S1217, the initial absolute position of the focusing lens 105 is calculated on the basis of the reset-switch position measured from the origin (by subtracting the distance between the reset-switch position and the focusing-lens position from the reset-switch position measured from the origin.) Accordingly, if the focusing lens 105 is made to move until the value of the lens-position detecting counter Cf reaches the value of the memory Cfo, the focusing lens 105 can be moved to a position where the focusing lens 105 was located before the power source was turned on.

The initial lens position of the focusing lens 105 is obtained in the above-described manner, and the process proceeds to Step S1218. In Step S1218, it is determined whether the return destination position of the focusing lens 105 which is stored in the memory Cfo and the reset position of the focusing lens 105 which is stored in the lens-position detecting counter Cf are equal to each other. If both positions are equal, it is determined that the focusing lens 105 is previously located at the return destination position, the process jumps to Step S1224.

On the other hand, if the result of the decision made in Step S1218 is false, it is determined in Step S1219 whether the value of the return destination position stored in the memory Cfo is greater than the value of the current focusing-lens position stored in the lens-position detecting counter Cf. If the value of the return destination position is greater than the value of the current focusing-lens position, it is determined that a direction in which to return the focusing lens 105 is the closest-distance direction, and the process proceeds to Step S1220. In Step S1220, the focusing lens 105 is driven in the closest-distance direction. Then, in Step S1221, it is confirmed whether the focusing lens 105 has arrived at the return destination position stored in the memory Cfo. If the arrival of the focusing lens 105 at the return destination position is confirmed, the process proceeds to Step S1224, whereas if the focusing lens 105 has not yet arrived at the return destination position, the process returns to Step S1220.

If the result of the decision made in Step S1219 is false, it is determined that the return destination position of the focusing lens 105 is located on a more infinity side than the current position of the focusing lens 105, and the process proceeds to Step S1222. Through Steps S1222 and S1223, the process performs an operation and a decision which are opposite to the corresponding ones of Steps S1220 and S1221. If it is confirmed in Step S1223 that the focusing lens 105 has arrived at the return destination position, the process proceeds to Step S1224.

In Step S1224, the driving of the focusing lens 105 is stopped. Then, in Step S1225, after an image is outputted, a normal image pickup operation is executed. After that, it is determined in Step S1226 whether the image pickup operation is completed and the power source is shut off. If the power source is not shut off, the process returns to Step S1204, whereas if the power source is shut off, the process proceeds to Step S1227, in which the phase state of driving current that corresponds to the stop position of the rotor of the focusing motor 121 at this time is stored (backed up) in the memory Bf.

Figure 13:
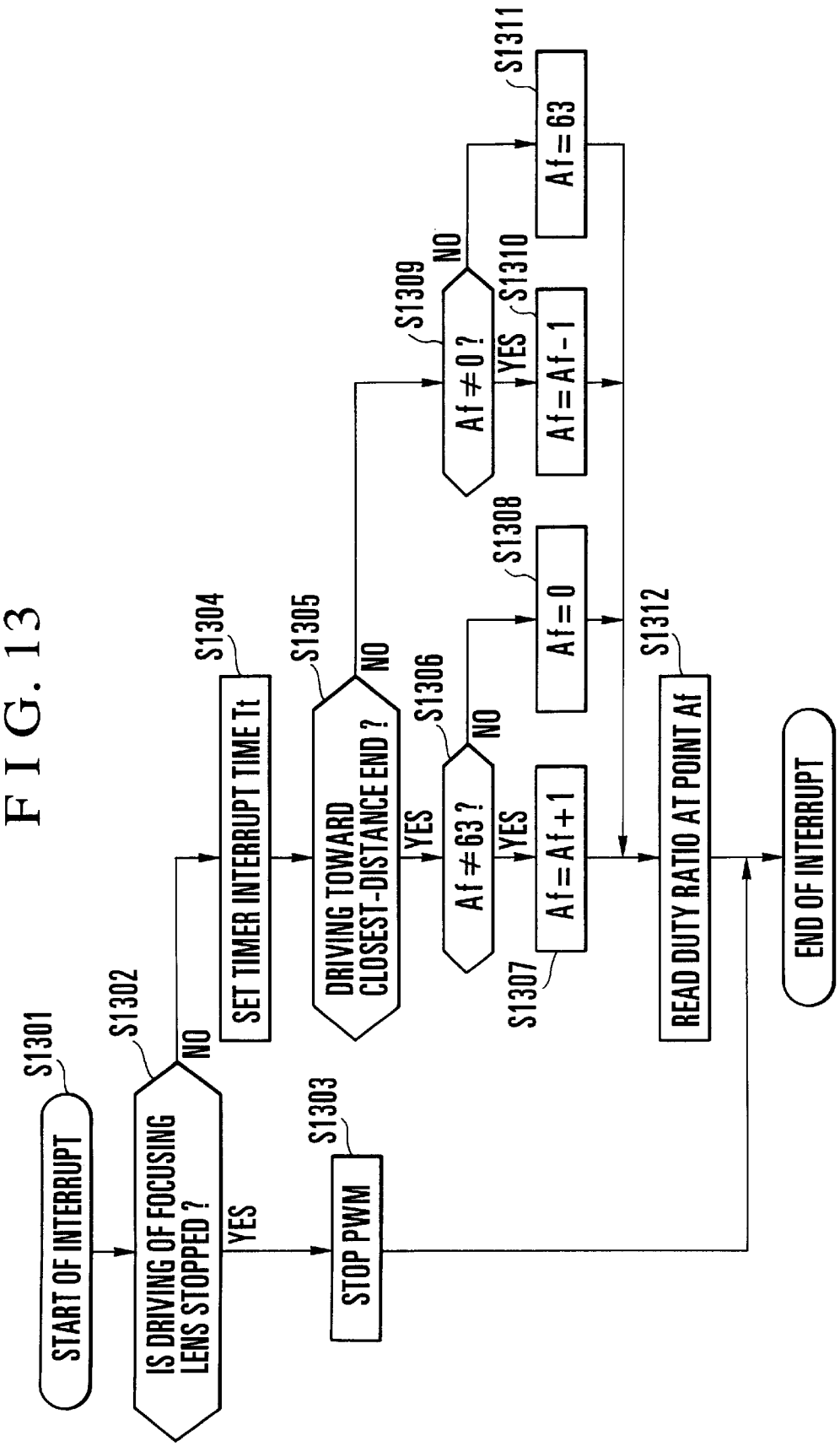
FIG. 13 is a flowchart showing the fourth embodiment of the present invention and showing the flow of operation of a timer interrupt routine.

FIG. 13 is a flowchart representing the feature of the fourth embodiment, and shows the flow of operation of a timer interrupt process relative to the focusing lens 105. The timer interrupt process causes an interrupt at a timing determined by the driving speed which has been set in Step S1004 of FIG. 10, and outputs an interrupt driving pulse at a shorter period for a faster driving speed and at a longer period for a slower driving speed.

Referring to FIG. 13, in Step S1301, the timer interrupt routine is started, and in Step S1302, it is determined whether the driving speed which has been set in the above-described main routine shown in FIG. 10 is "0". If the driving speed is "0", it is determined that the pulse motor 121 need not be driven, and the process proceeds to Step S1303, in which the output from the PWM unit is stopped. On the other hand, if the driving speed is not "0", the process proceeds to Step S1304, in which the timer interrupt time Tt according to the driving speed which has been set in Step S1004 of FIG. 10 is set.

Then, in Step S1305, it is determined whether the driving direction which has been set for the focusing motor 121 in Step S1004 of FIG. 10 is the closest-distance direction. If the driving direction is the closest-distance direction, the process proceeds to Step S1306, in which it is determined whether the value of the counter Af is "63". If the value of the counter Af is not "63", the process proceeds to Step S1307, in which the value of the counter Af is incremented, whereas if the value of the counter Af is "63", the process proceeds to Step S1308, in which the value of the counter Af is set to "0". This value of the counter Af indicates which of the sixty-four points of one sine-wave cycle corresponds to a phase position which is currently reached by the rotor of the pulse motor 121.

If it is determined in Step S1305 that the driving direction for the focusing motor 121 is not the closest-distance direction, the process proceeds to Step S1309, in which it is determined whether the value of the counter Af is "0". If the value of the counter Af is not "0", the process proceeds to Step S1310, in which the value of the counter Af is decremented, whereas if the value of the counter Af is "0", the process proceeds to Step S1311, in which the value of the counter Af is set to "63". Then, in Step S1312, the basic duty ratio data Dn, such as that shown in FIG. 18, which is indicated by the value of the counter Af (for example, "0" to "63") indicative of the phase state of the pulse motor 121 at this time is read.

As is apparent from the above description, in the fourth embodiment, during the initial operation of resetting the lens-position detecting counter for the focusing lens 105 when the power source is turned on, the number of pulses to be applied to the pulse motor 121 while the focusing lens 105 is moving from its movement start position to the position of the photosensor 127 is calculated in terms of a stored (backup) value indicative of the previous stop position of the pulse motor 121. Accordingly, it is possible to prevent the deviation of actual driving of the pulse motor 121 from the count value of the lens-position detecting counter, and it is possible to effect accurate position detection without a special position detecting device.

As is apparent from the foregoing description, there is provided storage means for storing a stop phase position which is reached by a rotor when a pulse motor is brought to a driving-stopped state, and, for example, a count value of counting means for counting the number of pulses during driving of the pulse motor is corrected at the time of a start of driving of the pulse motor, by using information indicative of the stop phase position stored in the storage means. A phase position which is reached by the rotor at the time of stoppage of the pulse motor is stored (backed up), and when the pulse motor is to be again activated at a later time, the counting means for detecting the phase position is held in a stopped state until the phase state of driving current reaches the backed-up phase state. Accordingly, it is possible to prevent the deviation of actual driving of the pulse motor from the count value of the phase position detecting counter, and it is possible to effect accurate position detection without a special position detecting device.

In addition, at the time of a start of the driving of the pulse motor, a start excitation phase required for driving of the pulse motor is corrected by using information indicative of a stop phase position stored in the storage means. A phase position which is reached by the rotor at the time of stoppage of the pulse motor is stored (backed up), and when the pulse motor is to be again activated at a later time, the pulse motor is excited with the phase stored at the time of stoppage of the pulse motor, whereby it is possible to more easily prevent the deviation of actual driving of the pulse motor from the count value of the phase position detecting counter, and it is possible to effect accurate position detection without a special position detecting device.

In addition, in an image pickup system which comprises at least one lens group which is movable in parallel with an optical axis, a pulse motor for moving the lens group, driving means for driving the pulse motor with an approximate sine wave, and lens position detecting means for detecting a position of the lens group by counting the number of pulses during driving of the pulse motor, storage means for storing a stop phase position which is reached by a rotor when the pulse motor is brought to a driving-stopped state is provided so that when the initializing means is to initialize the lens position detecting means by moving the lens group, a count value of the lens position detecting means is corrected by using information indicative of the stop phase position stored in the storage means. Accordingly, it is possible to prevent the deviation of actual driving of the pulse motor from the count value of a phase position detecting counter for a variator lens or the count value of a phase position detecting counter for a focusing lens, and it is possible to effect accurate phase position detection without a special position detecting device and move the lens group to an accurate reset position.

I claim:

1. A pulse motor control apparatus comprising:

driving means for driving a pulse motor with an approximate sine wave;

counting means for counting the number of pulses during driving of the pulse motor; and storage means for storing information relative to a stop phase position of a rotor when the pulse motor is brought to a driving-stopped state.

2. A pulse motor control apparatus according to claim 1, further comprising correcting means for correcting a count value of said counting means by using the information indicative of the stop phase position stored in said storage means at the time of a start of driving of the pulse motor.

3. A pulse motor control apparatus according to claim 2, wherein said correcting means includes:

second counting means for counting the number of pulses from the start of driving of the pulse motor; and coincidence determining means for determining whether the number of pulses indicative of the stop phase position of the rotor during the driving-stopped state, stored in said storage means, and the number of pulses counted by said second counting means coincide with each other, and, if both the numbers of pulses coincide with each other, causing said first-mentioned counting means to start a counting operation.

4. A pulse motor control apparatus according to claim 1, further comprising correcting means for correcting a start excitation phase required for driving of the pulse motor, at the time of a start of the driving of the pulse motor, by using the information relative to the stop phase position stored in said storage means.

5. A pulse motor control apparatus according to claim 4, wherein said correcting means includes:

address generating means for generating an address indicative of an excitation phase of the pulse motor; and address correcting means for correcting a start address at the time of a start of driving of the pulse motor, by using the information relative to the stop phase position stored in said storage means.

6. A pulse motor control method comprising the steps of:

storing, in a recording medium, information relative to a stop phase position of a rotor when a pulse motor is brought to a driving-stopped state; and correcting a count value of counting means for counting the number of pulses during driving of the pulse motor, at the time of a start of the driving of the pulse motor, by using the information relative to the stop phase position stored in the recording medium.

7. A pulse motor control method according to claim 6, wherein said correcting step having a second counting step of counting the number of pulses from the start of driving of the pulse motor and a determining step of determining whether the number of pulses indicative of the stop phase position of the rotor during the driving stopped state, which stop phase position is storage means, and number of pulses counted by said second counting step coincide with each other, and, if both the numbers of pulses coincide with each, other causing said first-mentioned counting step to start a counting operation.

8. A pulse motor control method comprising the steps of:

storing, in a recording medium, information relative to a stop phase position which is reached by a rotor when a pulse motor is brought to a driving-stopped state; and correcting a start excitation phase required for driving of the pulse motor, at the time of a start of the driving of the pulse motor, by using information relative to the stop phase position stored in the recording medium.

9. A pulse motor control method according to claim 8, further comprising correcting step of correcting a start excitation phase required for driving of the pulse motor, at the time of a start of the driving of the pulse motor, by using information indicative of the stop phase position of the rotor when the pulse motor is brought to the driving stopped state.

10. A lens control apparatus comprising:

at least one lens group which is movable in parallel with an optical axis;

a pulse motor for moving said lens group;

driving means for driving said pulse motor with an approximate sine wave;

lens position detecting means for detecting a position of said lens group by counting the number of pulses during driving of said pulse motor;

initializing means for initializing said lens position detecting means by moving said lens group;

storage means for storing information relative to a stop phase position of a rotor when said pulse motor is brought to a driving-stopped state; and correcting means for correcting, when said initializing means is to initialize said lens position detecting means by moving said lens group, a count value of said lens position detecting means by using the information stored in said storage means.

11. A lens control apparatus according to claim 8, wherein said at least one lens group includes a variator lens for varying magnification.

12. A lens control apparatus according to claim 8 or 11, wherein said at least one lens group includes a focusing lens for adjusting focus.

13. A pulse motor control apparatus comprising:

driving means for driving a pulse motor with a PWM control;

counting means for counting the number of pulses during driving of the pulse motor; and storage means for storing information relative to a stop phase position of a rotor when the pulse motor is brought to a driving-stopped state.

14. A pulse motor control apparatus according to claim 13, further comprising correcting means for correcting a count value of said counting means by using the information indicative of the stop phase position stored in said storage means at the time of a start of driving of the pulse motor.

15. A pulse motor control apparatus according to claim 14, wherein said correcting means includes:

second counting means for counting the number of pulses from the start of driving of the pulse motor; and coincidence determining means for determining whether the number of pulse indicative of the stop phase position of the rotor during the driving-stopped state, stored in said storage means, and the number of pulses counted by said second counting means coincide with each other, and, if both the number of pulses coincides with each other, causing said first mentioned counting means to start a counting operation.

16. A pulse motor control apparatus according to claim 13, further comprising correcting means for correcting a start excitation phase required for driving of the pulse motor, at the time of a start of the driving of the pulse motor, by using the information relative to the stop phase position stored in said storage means.

17. A pulse motor control apparatus according to claim 16, wherein said correcting means includes:

address generating means for generating an address indicative of an excitation phase of the pulse motor; and address correcting means for correcting a start address at the time of a start of driving of the pulse motor, by using the information relative to the stop phase position stored in said storage means.

18. A video camera apparatus comprising:

at least on lens group which is movable in parallel with an optical axis;

a pulse motor for moving said lens group;

driving means for driving said pulse motor with an approximate sine wave;

lens position detecting means for detecting a position of said lens group by counting the number of pulses during driving of said pulse motor;

initializing means for initializing said lens position detecting means by moving said lens group;

storage means for storing information relative to a stop phase position of a rotor when said pulse motor is brought to a driving-stopped state; and correcting means for correcting, when said initializing means is to initialize said lens position detecting means by moving said lens group, a count value of said lens position detecting means by using the information stored in said storage means.

19. A video camera apparatus according to claim 18, wherein said at least one lens group includes a variator lens for varying magnification.

20. A video camera apparatus according to claim 18, wherein said at least one lens group includes a focusing lens for adjusting focus.

* * * * *

UNITED STATES PATENT AND TRADEMARK OFFICE
CERTIFICATE OF CORRECTION

PATENT NO. : 6,118,945
DATED : September 12, 2000
INVENTOR(S) : Taeko Tanaka

It is certified that error appears in the above-identified patent and that said Letters Patent is hereby corrected as shown below:

Column 16,
Line 43, delete "motordriving" and insert -- motor-driving --.

Column 21,
Line 31, delete "claim 8" and insert -- claim 10 --.
Line 34, delete "claims 8 or 11" and insert -- claims 10 or 11 --.

Signed and Sealed this

Twenty-fifth Day of December, 2001

Attest:

Attesting Officer

JAMES E. ROGAN
Director of the United States Patent and Trademark Office